US009709078B2

(12) United States Patent
Kim et al.

(10) Patent No.: US 9,709,078 B2
(45) **Date of Patent: *Jul. 18, 2017**

(54) ROTARY PISTON TYPE ACTUATOR WITH A CENTRAL ACTUATION ASSEMBLY

(71) Applicant: Woodward, Inc., Fort Collins, CO (US)

(72) Inventors: Joseph H. Kim, Valencia, CA (US); Robert P. O'Hara, Castaic, CA (US); Shahbaz H. Hydari, Los Angeles, CA (US); Pawel A. Sobolewski, Arlington Heights, IL (US)

(73) Assignee: Woodward, Inc., Fort Collins, CO (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/865,536

(22) Filed: Sep. 25, 2015

(65) Prior Publication Data

US 2016/0010666 A1 Jan. 14, 2016

Related U.S. Application Data

(63) Continuation of application No. 13/831,220, filed on Mar. 14, 2013, now Pat. No. 9,163,648, which is a (Continued)

(51) Int. Cl.
*F15B 15/02* (2006.01)
*F01C 9/00* (2006.01)
(Continued)

(52) U.S. Cl.
CPC .............. *F15B 15/02* (2013.01); *F01C 9/002* (2013.01); *F15B 15/125* (2013.01); *B64C 13/40* (2013.01)

(58) Field of Classification Search
CPC .......... F01C 9/002; F15B 15/02; F15B 15/06; F15B 15/125; B64C 13/40
See application file for complete search history.

(56) References Cited

U.S. PATENT DOCUMENTS 2,286,452 A 6/1942 Worth
2,649,077 A 8/1953 Mehm
(Continued)

FOREIGN PATENT DOCUMENTS

AU 2013201056 11/2013
CA 2772480 9/2012
(Continued)

OTHER PUBLICATIONS

PCT International Preliminary Report on Patentability, PCT/US2015/013737, Aug. 11, 2016, 9 pages.
(Continued)

*Primary Examiner* — Logan Kraft
(74) *Attorney, Agent, or Firm* — Fish & Richardson P.C.

(57) ABSTRACT

A rotary actuator includes a housing defining an arcuate chamber including a cavity, a fluid port in fluid communication with the cavity, and an open end. A rotor assembly includes an output shaft and a rotor arm extending outward. An arcuate-shaped piston is disposed in said housing for reciprocal movement in the arcuate chamber through the open end, wherein a seal, the cavity, and the piston define a pressure chamber, and a portion of the piston contacts the first rotor arm. A central actuation assembly includes a central mounting point formed in an external surface of the output shaft, said central mounting point proximal to the longitudinal midpoint of the shaft, and an actuation arm removably attached at a proximal end to the central mounting point, said actuation arm adapted at a distal end for attachment to an external mounting feature of a member to be actuated.

10 Claims, 13 Drawing Sheets

Related U.S. Application Data continuation-in-part of application No. 13/778,561, filed on Feb. 27, 2013, now Pat. No. 9,234,535.

(51) Int. Cl.

*F15B 15/12* (2006.01)
*B64C 13/40* (2006.01)

(56) References Cited

U.S. PATENT DOCUMENTS

| | | | |
|---|---|---|---|
| 2,936,636 | A | 5/1960 | Wacht |
| 2,966,144 | A | 12/1960 | Self |
| 3,444,788 | A | 5/1969 | Sneen |
| 3,446,120 | A | 5/1969 | Sneen |
| 3,731,546 | A | 5/1973 | Macdonald |
| 3,771,422 | A | 11/1973 | Kamman |
| 4,296,570 | A | 10/1981 | Balbach et al. |
| 4,409,888 | A | 10/1983 | Weyer |
| 4,628,797 | A | 12/1986 | Kendall |
| 4,979,700 | A | 12/1990 | Tiedeman |
| 5,044,257 | A | 9/1991 | Scobie |
| 5,054,374 | A | 10/1991 | Scobie et al. |
| 5,235,900 | A | 8/1993 | Garceau |
| 5,386,761 | A | 2/1995 | Holtgraver |
| 5,495,791 | A | 3/1996 | Sande et al. |
| 5,722,616 | A | 3/1998 | Durand |
| 5,839,346 | A | 11/1998 | Sekiya et al. |
| 5,967,587 | A | 10/1999 | Collet |
| 6,865,982 | B2 | 3/2005 | Bunyard et al. |
| 7,384,016 | B2 | 6/2008 | Kota et al. |
| 7,436,094 | B2 | 10/2008 | Zhao et al. |
| 7,486,042 | B2 | 2/2009 | Potter et al. |
| 7,510,151 | B2 | 3/2009 | Perez-Sanchez |
| 7,549,605 | B2 | 6/2009 | Hanlon et al. |
| 7,578,476 | B2 | 8/2009 | Wiers et al. |
| 7,600,718 | B2 | 10/2009 | Perez-Sanchez |
| 7,665,694 | B2 | 2/2010 | Hein et al. |
| 7,731,124 | B2 | 6/2010 | Griffin |
| 7,762,500 | B1 | 7/2010 | Dhall |
| 7,871,033 | B2 | 1/2011 | Karem et al. |
| 7,895,935 | B2 | 3/2011 | Kells |
| 7,922,445 | B1 | 4/2011 | Pankey et al. |
| 7,930,971 | B2 | 4/2011 | Werkhoven |
| 7,954,769 | B2 | 6/2011 | Bushnell |
| 8,006,940 | B2 | 8/2011 | Zeumer |
| 8,033,509 | B2 | 10/2011 | Yount et al. |
| 8,080,966 | B2 | 12/2011 | Potter et al. |
| 8,181,550 | B2 | 5/2012 | Gemmati et al. |
| 8,210,473 | B2 | 7/2012 | Schweighart et al. |
| 8,226,048 | B2 | 7/2012 | Beyer et al. |
| 8,245,495 | B2 | 8/2012 | Pesyna et al. |
| 8,245,976 | B2 | 8/2012 | Sakurai et al. |
| 8,245,982 | B2 | 8/2012 | Vormezeele et al. |
| 8,267,350 | B2 | 9/2012 | Elliott et al. |
| 8,272,599 | B2 | 9/2012 | Haverdings |
| 8,276,852 | B2 | 10/2012 | Shmilovich et al. |
| 8,302,903 | B2 | 11/2012 | Morgan et al. |
| 8,322,647 | B2 | 12/2012 | Amraly et al. |
| 8,333,348 | B1 | 12/2012 | Miller |
| 8,336,817 | B2 | 12/2012 | Flatt |
| 8,336,818 | B2 | 12/2012 | Flatt |
| 8,362,719 | B2 | 1/2013 | Sheahan, Jr. et al. |
| 8,376,818 | B2 | 2/2013 | Horner |
| 8,393,576 | B2 | 3/2013 | Lutke et al. |
| 8,403,415 | B2 | 3/2013 | Lawson |
| 8,424,810 | B1 | 4/2013 | Shmilovich et al. |
| 8,500,526 | B2 | 8/2013 | Horner |
| 8,511,608 | B1 | 8/2013 | Good et al. |
| 8,540,485 | B2 | 9/2013 | Bogrash |
| 8,544,791 | B2 | 10/2013 | Oyama et al. |
| 8,596,582 | B2 | 12/2013 | Uchida et al. |
| 8,596,583 | B2 | 12/2013 | Eichhorn et al. |
| 8,602,352 | B2 | 12/2013 | Keller et al. |
| 8,602,364 | B2 | 12/2013 | Dostmann et al. |
| 8,622,350 | B1 | 1/2014 | Hoffenberg |
| 8,628,045 | B2 | 1/2014 | Lauwereys et al. |
| 8,684,316 | B2 | 4/2014 | Sakurai et al. |
| 8,714,493 | B2 | 5/2014 | Morris |
| 8,726,787 | B2 | 5/2014 | Glynn et al. |
| 8,746,625 | B2 | 6/2014 | Recksiek et al. |
| 8,777,153 | B2 | 7/2014 | Parker |
| 8,800,935 | B2 | 8/2014 | Francis |
| 2006/0181171 | A1 | 8/2006 | Zhao |
| 2009/0031718 | A1 | 2/2009 | Kells |
| 2009/0260345 | A1 | 10/2009 | Chaudhry |
| 2010/0187368 | A1 | 7/2010 | Cathelain et al. |
| 2010/0319341 | A1 | 12/2010 | Blitz et al. |
| 2011/0181129 | A1 | 7/2011 | Aso |
| 2011/0198438 | A1 | 8/2011 | Colting |
| 2012/0031087 | A1 | 2/2012 | Reynolds et al. |
| 2012/0060491 | A1 | 3/2012 | Gunter et al. |
| 2012/0111993 | A1 | 5/2012 | DeHart |
| 2012/0325976 | A1 | 12/2012 | Parker |
| 2013/0104729 | A1 | 5/2013 | Ito et al. |
| 2013/0119197 | A1 | 5/2013 | Ducos |
| 2013/0133513 | A1 | 5/2013 | Ito |
| 2013/0181089 | A1 | 7/2013 | Recksiek et al. |
| 2013/0221158 | A1 | 8/2013 | Binkholder et al. |
| 2013/0247754 | A1 | 9/2013 | Ito et al. |
| 2013/0283942 | A1 | 10/2013 | Bouillot et al. |
| 2013/0299633 | A1 | 11/2013 | Tierney et al. |
| 2013/0320151 | A1 | 12/2013 | Kordel et al. |
| 2013/0327887 | A1 | 12/2013 | Dyckrup et al. |
| 2013/0345908 | A1 | 12/2013 | Dorr et al. |
| 2014/0001309 | A1 | 1/2014 | Tieys et al. |

FOREIGN PATENT DOCUMENTS

| | | | |
|---|---|---|---|
| CN | 2429672 | Y | 5/2001 |
| CN | 2683857 | Y | 3/2005 |
| CN | 201876368 | U | 6/2011 |
| CN | 102171914 | A | 8/2011 |
| CN | 202128132 | U | 2/2012 |
| CN | 202442867 | U | 9/2012 |
| DE | 624423 | | 1/1936 |
| DE | 872000 | | 3/1953 |
| DE | 102008036760 | | 2/2010 |
| DE | 102009052641 | | 5/2011 |
| EP | 0098614 | | 1/1984 |
| EP | 1985536 | | 10/2008 |
| EP | 2157299 | | 2/2010 |
| EP | 2586966 | | 5/2013 |
| EP | 2644823 | | 10/2013 |
| FR | 2138241 | | 1/1973 |
| GB | 893361 | | 4/1962 |
| GB | 1174028 | | 12/1969 |
| WO | WO 82/00045 | | 1/1982 |
| WO | WO2007/003000 | | 1/2007 |
| WO | WO2010/097596 | | 9/2010 |
| WO | WO2010/119280 | | 10/2010 |
| WO | WO2011/155866 | | 12/2011 |
| WO | WO2013/000577 | | 1/2013 |
| WO | WO2013/119242 | | 8/2013 |
| WO | WO2013/120036 | | 8/2013 |
| WO | WO2013/143538 | | 10/2013 |
| WO | WO2014/029972 | | 2/2014 |

OTHER PUBLICATIONS

PCT International Preliminary Report on Patentability, PCT/US2015/013895, Aug. 11, 2016, 11 pages.

Authorized Officer Romain Bindreiff, PCT International Preliminary Report on Patentability, PCT/US2014/017582, Feb. 10, 2015, 20 pages.

Authorized Officer Romain Bindreiff, PCT Written Opinion of the International Preliminary Examining Authority, PCT/US2014/017473, Feb. 2, 2015, 6 pages.

Authorized Officer Romain Bindreiff, PCT Written Opinion of the International Preliminary Examining Authority, PCT/US2014/017928, Feb. 3, 2015, 5 pages.

International Search Report and Written Opinion issued in International Application No. PCT/US2014/017582 on May 8, 2014; 11 pages.

(56) References Cited

OTHER PUBLICATIONS

International Search Report and Written Opinion issued in International Application No. PCT/US2014/017928 on May 20, 2014; 12 pages.
International Search Report and Written Opinion of the International Searching Authority issued in International Application No. PCT/US2014/017473 on May 13, 2014; 12 pages.
International Search Report and Written Opinion of the International Searching Authority issued in International Application No. PCT/US2014/042257 on Sep. 10, 2014; 12 pages.
International Search Report and Written Opinion of the International Searching Authority issued in International Application No. PCT/US2015/013707 on May 29, 2015; 14 pages.
International Search Report and Written Opinion of the International Searching Authority issued in International Application No. PCT/US2015/013737 on May 21, 2015, 13 pages.
Invitation to Pay Additional Fees and Partial International Search Report issued in International Application No. PCT/US2015/013895 on May 20, 2015; 5 pages.
Kim et al., "Rotary Piston Type Actuator with a Central Actuation Assembly", U.S. Appl. No. 13/921,904, Jun. 29, 2013, 77 pages.
Kim et al., "Rotary Piston Type Actuator with Hydraulic Supply", U.S. Appl. No. 14/258,434, Apr. 22, 2014, 167 pages.
Kim et al., "Rotary Piston Type Actuator", U.S. Appl. No. 13/778,561, Feb. 27, 2013, 56 pages.
Sobolewski et al., "Rotary Piston Type Actuator with Modular Housing", U.S. Appl. No. 14/170,461, Jan. 31, 2014, 100 pages.
Sobolewski et al., "Rotary Piston Type Actuator with Pin Retention Features", U.S. Appl. No. 14/170,434, Jan. 31, 2014, 97 pages.
International Search Report issued in International Application No. PCT/US2015/013895 on Jul. 31, 2015; 17 pages.
PCT International Preliminary Report on Patentability, PCT/US2014/017928, Jul. 2, 2015, 24 pages.
PCT International Preliminary Report on Patentability, PCT/US2014/017473, Jul. 2, 2015, 21 pages.
International Preliminary Report on Patentability under Chapter I issued in International Application No. PCT/2014/042257 on Dec. 30, 2015, 9 pages.
The State Intellectual Property Office of People's Republic of China, Chinese First Office Action, Feb. 4, 2017, 24 pages.
The State Intellectual Property Office of People's Republic of China, Chinese Application No. 201480023776.3, Chinese First Office Action, Mar. 31, 2017, 10 pages.

ROTARY PISTON TYPE ACTUATOR WITH A CENTRAL ACTUATION ASSEMBLY

CROSS REFERENCE TO RELATED APPLICATIONS

This application is a continuation of and claims the benefit of priority to U.S. patent application Ser. No. 13/831,220, filed Mar. 14, 2013 and entitled "ROTARY PISTON TYPE ACTUATOR WITH A CENTRAL ACTUATION ASSEMBLY", which is a continuation in part of and claims the benefit of the priority of U.S. patent application Ser. No. 13/778,561, filed Feb. 27, 2013 and entitled "ROTARY PISTON TYPE ACTUATOR", the disclosure of which is incorporated by reference in its entirety.

TECHNICAL FIELD

This invention relates to an actuator device and more particularly to a rotary piston type actuator device wherein the pistons of the rotor are moved by fluid under pressure and wherein the actuator device includes a central actuation assembly adapted for attachment to and external mounting feature on a member to be actuated.

BACKGROUND

Rotary hydraulic actuators of various forms are currently used in industrial mechanical power conversion applications. This industrial usage is commonly for applications where continuous inertial loading is desired without the need for load holding for long durations, e.g. hours, without the use of an external fluid power supply. Aircraft flight control applications generally implement loaded positional holding, for example, in a failure mitigation mode, using substantially only the blocked fluid column to hold position.

In certain applications, such as primary flight controls used for aircraft operation, positional accuracy in load holding by rotary actuators is desired. Positional accuracy can be improved by minimizing internal leakage characteristics inherent to the design of rotary actuators. However, it can be difficult to provide leak-free performance in typical rotary hydraulic actuators, e.g., rotary "vane" or rotary "piston" type configurations.

SUMMARY

In general, this document relates to rotary piston-type actuators.

In a first aspect, a rotary actuator includes a first housing defining a first arcuate chamber including a first cavity, a first fluid port in fluid communication with the first cavity, and an open end, a rotor assembly rotatably journaled in said first housing and including a rotary output shaft and a first rotor arm extending radially outward from the rotary output shaft, an arcuate-shaped first piston disposed in said first housing for reciprocal movement in the first arcuate chamber through the open end, wherein a first seal, the first cavity, and the first piston define a first pressure chamber, and a first portion of the first piston contacts the first rotor arm, a central actuation assembly including a central mounting point formed in an external surface of the rotary output shaft, said central mounting point proximal to the longitudinal midpoint of the shaft, and an actuation arm removably attached at a proximal end to the central mounting point, said actuation arm adapted at a distal end for attachment to an external mounting feature of a member to be actuated.

Various embodiments can include some, all, or none of the following features. The central actuation assembly can also include a radial recess formed in an external peripheral surface of the first housing proximal to the central mounting point of the rotor shaft, and wherein said actuation arm extends through the radial recess. The rotary actuator can also include a central mounting assembly having a radially projecting portion of the first housing, said central mounting assembly disposed about 180 degrees from the radial recess of the central actuation assembly, said central mounting assembly adapted for attachment to an external mounting feature. The first housing can also define a second arcuate chamber comprising a second cavity, and a second fluid port in fluid communication with the second cavity, the rotor assembly can also include a second rotor arm, and the rotary actuator can also include an arcuate-shaped second piston disposed in said first housing for reciprocal movement in the second arcuate chamber, wherein a second seal, the second cavity, and the second piston can define a second pressure chamber, and a first portion of the second piston can contact the second rotor arm. The central actuation assembly can also include a radial recess formed in an external peripheral surface of the first housing proximal to the central mounting point of the rotor shaft, and the actuation arm can extend through the radial recess. The rotary actuator can include a central mounting assembly having a radially projecting portion of the first housing, said central mounting assembly disposed about 180 degrees from the radial recess of the central actuation assembly, said central mounting assembly adapted for attachment to an external mounting feature. The first housing can be formed as a one-piece housing.

In a second aspect, a method of rotary actuation includes providing a rotary actuator. The rotary actuator includes a first housing defining a first arcuate chamber comprising a first cavity, a first fluid port in fluid communication with the first cavity, and an open end, a rotor assembly rotatably journaled in said first housing and comprising a rotary output shaft and a first rotor arm extending radially outward from the rotary output shaft, an arcuate-shaped first piston disposed in said first housing for reciprocal movement in the first arcuate chamber through the open end, wherein a first seal, the first cavity, and the first piston define a first pressure chamber, and a first portion of the first piston contacts the first rotor arm, a central actuation assembly including a central mounting point formed in an external surface of the rotary output shaft, said central mounting point proximal to the longitudinal midpoint of the shaft, and an actuation arm removably attached at a proximal end to the central mounting point, said actuation arm adapted at a distal end for attachment to an external mounting feature of a member to be actuated. The method also includes applying pressurized fluid to the first pressure chamber, urging the first piston partially outward from the first pressure chamber to urge rotation of the rotary output shaft in a first direction, rotating the rotary output shaft in a second direction opposite that of the first direction, and urging the first piston partially into the first pressure chamber to urge pressurized fluid out the first fluid port.

Various implementations can include some, all, or none of the following features. The first housing can further define a second arcuate chamber comprising a second cavity, and a second fluid port in fluid communication with the second cavity, the rotor assembly further comprises a second rotor arm, and the rotary actuator further comprises an arcuate-shaped second piston disposed in said first housing for reciprocal movement in the second arcuate chamber, wherein a second seal, the second cavity, and the second piston define a second pressure chamber, and a first portion of the second piston contacts the second rotor arm. The central actuation assembly can further include a radial recess formed in an external peripheral surface of the first housing proximal to the central mounting point of the rotor shaft, and wherein said actuation arm extends through the radial recess. The rotary actuator can further include a central mounting assembly comprising a radially projecting portion of the first housing, said central mounting assembly disposed about 180 degrees from the radial recess of the central actuation assembly, said central mounting assembly adapted for attachment to an external mounting feature.

The systems and techniques described herein may provide one or more of the following advantages. First, a system can provide performance characteristics generally associated with linear fluid actuators in a compact and lightweight package more generally associated with rotary fluid actuators. Second, the system can substantially maintain a selected rotational position while under load by blocking the supply of fluids to and/or from the actuator. Third, the system can use commercially available seal assemblies originally intended for use in linear fluid actuator applications. Fourth, the system can provide rotary actuation with substantially constant torque over stroke. Fifth, the system can provide the aforementioned advantages as an actuator that is mounted and/or actuated at a midpoint of the actuator.

The details of one or more implementations are set forth in the accompanying drawings and the description below. Other features and advantages will be apparent from the description and drawings, and from the claims.

DETAILED DESCRIPTION

This document describes devices for producing rotary motion. In particular, this document describes devices that can convert fluid displacement into rotary motion through the use of components more commonly used for producing linear motion, e.g., hydraulic or pneumatic linear cylinders. Vane-type rotary actuators are relatively compact devices used to convert fluid motion into rotary motion. Rotary vane actuators (RVA), however, generally use seals and component configurations that exhibit cross-vane leakage of the driving fluid. Such leakage can affect the range of applications in which such designs can be used. Some applications may require a rotary actuator to hold a rotational load in a selected position for a predetermined length of time, substantially without rotational movement, when the actuator's fluid ports are blocked. For example, some aircraft applications may require that an actuator hold a flap or other control surface that is under load (e.g., through wind resistance, gravity or g-forces) at a selected position when the actuator's fluid ports are blocked. Cross-vane leakage, however, can allow movement from the selected position.

Linear pistons use relatively mature sealing technology that exhibits well-understood dynamic operation and leakage characteristics that are generally better than rotary vane actuator type seals. Linear pistons, however, require additional mechanical components in order to adapt their linear motions to rotary motions. Such linear-to-rotary mechanisms are generally larger and heavier than rotary vane actuators that are capable of providing similar rotational actions, e.g., occupying a larger work envelope. Such linear-to-rotary mechanisms may also generally be installed in an orientation that is different from that of the load they are intended to drive, and therefore may provide their torque output indirectly, e.g., installed to push or pull a lever arm that is at a generally right angle to the axis of the axis of rotation of the lever arm. Such linear-to-rotary mechanisms may therefore become too large or heavy for use in some applications, such as aircraft control where space and weight constraints may make such mechanisms impractical for use.

In general, rotary piston assemblies use curved pressure chambers and curved pistons to controllably push and pull the rotor arms of a rotor assembly about an axis. In use, certain embodiments of the rotary piston assemblies described herein can provide the positional holding characteristics generally associated with linear piston-type fluid actuators, to rotary applications, and can do so using the relatively more compact and lightweight envelopes generally associated with rotary vane actuators.

Figure 3:
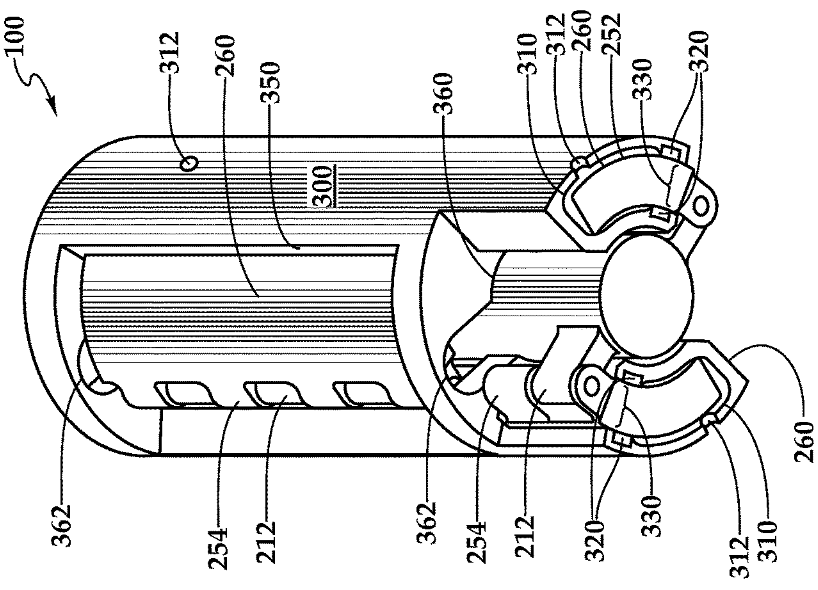
FIG. 3 is a perspective cross-sectional view of an example rotary piston-type actuator.
Figure 2:
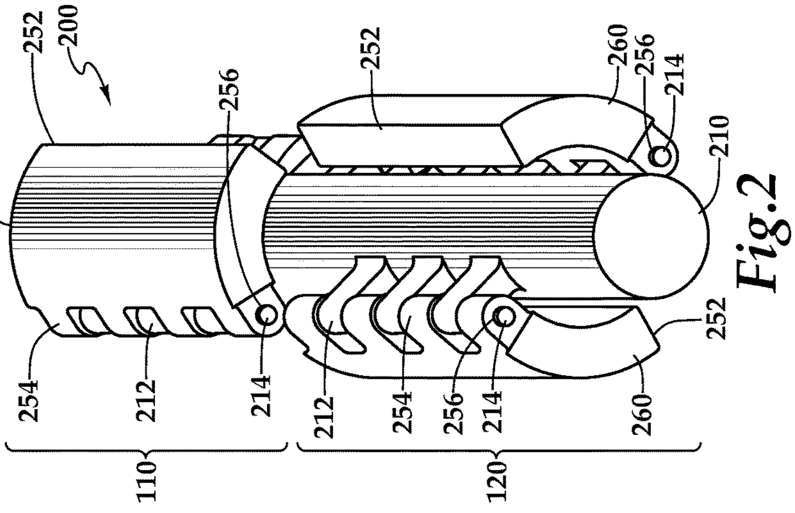
FIG. 2 is a perspective view of an example rotary piston assembly.
Figure 1:
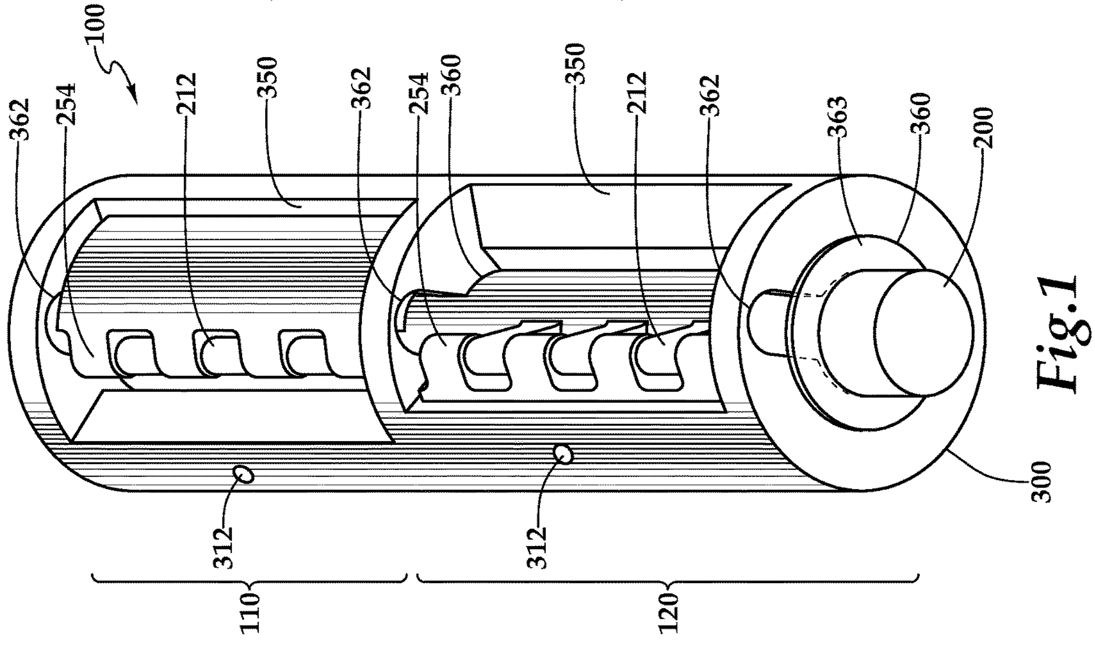
FIG. 1 is a perspective view of an example rotary piston-type actuator.

FIGS. 1-3 show various views of the components of an example rotary piston-type actuator 100. Referring to FIG. 1, a perspective view of the example rotary piston-type actuator 100 is shown. The actuator 100 includes a rotary piston assembly 200 and a pressure chamber assembly 300. The actuator 100 includes a first actuation section 110 and a second actuation section 120. In the example of actuator 100, the first actuation section 110 is configured to rotate the rotary piston assembly 200 in a first direction, e.g., counterclockwise, and the second actuation section 120 is configured to rotate the rotary piston assembly 200 in a second direction substantially opposite the first direction, e.g., clockwise.

Referring now to FIG. 2, a perspective view of the example rotary piston assembly 200 is shown apart from the pressure chamber assembly 300. The rotary piston assembly 200 includes a rotor shaft 210. A plurality of rotor arms 212 extend radially from the rotor shaft 210, the distal end of each rotor arm 212 including a bore (not shown) substantially aligned with the axis of the rotor shaft 210 and sized to accommodate one of the collection of connector pins 214.

As shown in FIG. 2, the first actuation section 110 includes a pair of rotary pistons 250, and the second actuation section 120 includes a pair of rotary pistons 260. While the example actuator 100 includes two pairs of the rotary pistons 250, 260, other embodiments can include greater and/or lesser numbers of cooperative and opposing rotary pistons. Examples of other such embodiments will be discussed below, for example, in the descriptions of FIGS. 4-25.

In the example rotary piston assembly shown in FIG. 2, each of the rotary pistons 250, 260 includes a piston end 252 and one or more connector arms 254. The piston end 252 is formed to have a generally semi-circular body having a substantially smooth surface. Each of the connector arms 254 includes a bore 256 substantially aligned with the axis of the semi-circular body of the piston end 252 and sized to accommodate one of the connector pins 214.

The rotary pistons 260 in the example assembly of FIG. 2 are oriented substantially opposite each other in the same rotational direction. The rotary pistons 250 are oriented substantially opposite each other in the same rotational direction, but opposite that of the rotary pistons 260. In some embodiments, the actuator 100 can rotate the rotor shaft 210 about 60 degrees total.

Each of the rotary pistons 250, 260 of the example assembly of FIG. 2 may be assembled to the rotor shaft 210 by aligning the connector arms 254 with the rotor arms 212 such that the bores (not shown) of the rotor arms 212 align with the bores 265. The connector pins 214 may then be inserted through the aligned bores to create hinged connections between the pistons 250, 260 and the rotor shaft 210. Each connector pin 214 is slightly longer than the aligned bores. In the example assembly, about the circumferential periphery of each end of each connector pin 214 that extends beyond the aligned bores is a circumferential recess (not shown) that can accommodate a retaining fastener (not shown), e.g., a snap ring or spiral ring.

FIG. 3 is a perspective cross-sectional view of the example rotary piston-type actuator 100. The illustrated example shows the rotary pistons 260 inserted into a corresponding pressure chamber 310 formed as an arcuate cavity in the pressure chamber assembly 300. The rotary pistons 250 are also inserted into corresponding pressure chambers 310, not visible in this view.

In the example actuator 100, each pressure chamber 310 includes a seal assembly 320 about the interior surface of the pressure chamber 310 at an open end 330. In some implementations, the seal assembly 320 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 100 may be reduced by using a standard, e.g., commercially available, semi-circular, unidirectional seal designs generally used in linear hydraulic actuators. In some embodiments, the seal assembly 320 can be a one-piece seal.

In some embodiments of the example actuator 100, the seal assembly 320 may be included as part of the rotary pistons 250, 260. For example, the seal assembly 320 may be located near the piston end 252, opposite the connector arm 254, and slide along the interior surface of the pressure chamber 310 to form a fluidic seal as the rotary piston 250, 260 moves in and out of the pressure chamber 310. An example actuator that uses such piston-mounted seal assemblies will be discussed in the descriptions of FIGS. 26-28. In some embodiments, the seal 310 can act as a bearing. For example, the seal assembly 320 may provide support for the piston 250, 260 as it moves in and out of the pressure chamber 310.

In some embodiments, the actuator 100 may include a wear member between the piston 250, 260 and the pressure chamber 310. For example, a wear ring may be included in proximity to the seal assembly 320. The wear ring may act as a pilot for the piston 250, 260, and/or act as a bearing providing support for the piston 250, 260.

In the example actuator 100, when the rotary pistons 250, 260 are inserted through the open ends 330, each of the seal assemblies 320 contacts the interior surface of the pressure chamber 310 and the substantially smooth surface of the piston end 252 to form a substantially pressure-sealed region within the pressure chamber 310. Each of the pressure chambers 310 may include a fluid port 312 formed through the pressure chamber assembly 300, through with pressurized fluid may flow. Upon introduction of pressurized fluid, e.g., hydraulic oil, water, air, gas, into the pressure chambers 310, the pressure differential between the interior of the pressure chambers 310 and the ambient conditions outside the pressure chambers 310 causes the piston ends 252 to be urged outward from the pressure chambers 310. As the piston ends 252 are urged outward, the pistons 250, 260 urge the rotary piston assembly 200 to rotate.

In the example of the actuator 100, cooperative pressure chambers may be fluidically connected by internal or external fluid ports. For example, the pressure chambers 310 of the first actuation section 110 may be fluidically interconnected to balance the pressure between the pressure chambers 310. Similarly the pressure chambers 310 of the second actuation section 120 may be fluidically interconnected to provide similar pressure balancing. In some embodiments, the pressure chambers 310 may be fluidically isolated from each other. For example, the pressure chambers 310 may each be fed by an independent supply of pressurized fluid.

In the example of the actuator 100, the use of the alternating arcuate, e.g., curved, rotary pistons 250, 260 arranged substantially opposing each other operates to translate the rotor arms in an arc-shaped path about the axis of the rotary piston assembly 200, thereby rotating the rotor shaft 210 clockwise and counter-clockwise in a substantially torque balanced arrangement. Each cooperative pair of pressure chambers 310 operates uni-directionally in pushing the respective rotary piston 250 outward, e.g., extension, to drive the rotor shaft 210 in the specific direction. To reverse direction, the opposing cylinder section's 110 pressure chambers 260 are pressurized to extend their corresponding rotary pistons 260 outward.

The pressure chamber assembly 300, as shown, includes a collection of openings 350. In general, the openings 350 provide space in which the rotor arms 212 can move when the rotor shaft 210 is partly rotated. In some implementations, the openings 350 can be formed to remove material from the pressure chamber assembly 300, e.g., to reduce the mass of the pressure chamber assembly 300. In some implementations, the openings 350 can be used during the process of assembly of the actuator 100. For example, the actuator 100 can be assembled by inserting the rotary pistons 250, 260 through the openings 350 such that the piston ends 252 are inserted into the pressure chambers 310. With the rotary pistons 250, 260 substantially fully inserted into the pressure chambers 310, the rotor shaft 210 can be assembled to the actuator 100 by aligning the rotor shaft 210 with an axial bore 360 formed along the axis of the pressure chamber assembly 300, and by aligning the rotor arms 212 with a collection of keyways 362 formed along the axis of the pressure chamber assembly 300. The rotor shaft 210 can then be inserted into the pressure chamber assembly 300. The rotary pistons 250, 260 can be partly extracted from the pressure chambers 310 to substantially align the bores 256 with the bores of the rotor arms 212. The connector pins 214 can then be passed through the keyways 362 and the aligned bores to connect the rotary pistons 250, 260 to the rotor shaft 210. The connector pins 214 can be secured longitudinally by inserting retaining fasteners through the openings 350 and about the ends of the connector pins 214. The rotor shaft 210 can be connected to an external mechanism as an output shaft in order to transfer the rotary motion of the actuator 100 to other mechanisms. A bushing or bearing 362 is fitted between the rotor shaft 210 and the axial bore 360 at each end of the pressure chamber assembly 300.

In some embodiments, the rotary pistons 250, 260 may urge rotation of the rotor shaft 210 by contacting the rotor arms 212. For example, the piston ends 252 may not be coupled to the rotor arms 212. Instead, the piston ends 252 may contact the rotor arms 212 to urge rotation of the rotor shaft as the rotary pistons 250, 260 are urged outward from the pressure chambers 310. Conversely, the rotor arms 212 may contact the piston ends 252 to urge the rotary pistons 250, 260 back into the pressure chambers 310.

In some embodiments, a rotary position sensor assembly (not shown) may be included in the actuator 100. For example, an encoder may be used to sense the rotational position of the rotor shaft 210 relative to the pressure chamber assembly or another feature that remains substantially stationary relative to the rotation of the shaft 210. In some implementations, the rotary position sensor may provide signals that indicate the position of the rotor shaft 210 to other electronic or mechanical modules, e.g., a position controller.

In use, pressurized fluid in the example actuator 100 can be applied to the pressure chambers 310 of the second actuation section 120 through the fluid ports 312. The fluid pressure urges the rotary pistons 260 out of the pressure chambers 310. This movement urges the rotary piston assembly 200 to rotate clockwise. Pressurized fluid can be applied to the pressure chambers 310 of the first actuation section 110 through the fluid ports 312. The fluid pressure urges the rotary pistons 250 out of the pressure chambers 310. This movement urges the rotary piston assembly 200 to rotate counter-clockwise. The fluid conduits can also be blocked fluidically to cause the rotary piston assembly 200 to substantially maintain its rotary position relative to the pressure chamber assembly 300.

In some embodiments of the example actuator 100, the pressure chamber assembly 300 can be formed from a single piece of material. For example, the pressure chambers 310, the openings 350, the fluid ports 312, the keyways 362, and the axial bore 360 may be formed by molding, machining, or otherwise forming a unitary piece of material.

Figure 4:
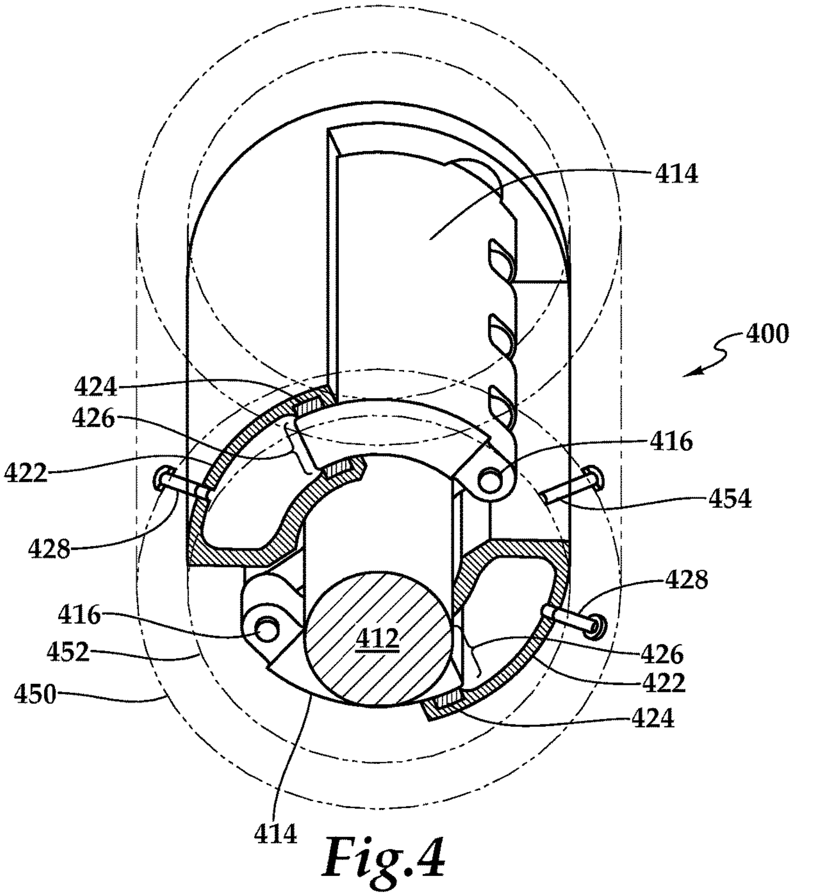
FIG. 4 is a perspective view of another example rotary piston-type actuator.

FIG. 4 is a perspective view of another example rotary piston-type actuator 400. In general, the actuator 400 is similar to the actuator 100, but instead of using opposing pairs of rotary pistons 250, 260, each acting uni-directionally to provide clockwise and counter-clockwise rotation, the actuator 400 uses a pair of bidirectional rotary pistons.

As shown in FIG. 4, the actuator 400 includes a rotary piston assembly that includes a rotor shaft 412 and a pair of rotary pistons 414. The rotor shaft 412 and the rotary pistons 414 are connected by a pair of connector pins 416.

The example actuator shown in FIG. 4 includes a pressure chamber assembly 420. The pressure chamber assembly 420 includes a pair of pressure chambers 422 formed as arcuate cavities in the pressure chamber assembly 420. Each pressure chamber 422 includes a seal assembly 424 about the interior surface of the pressure chamber 422 at an open end 426. The seal assemblies 424 contact the inner walls of the pressure chambers 422 and the rotary pistons 414 to form fluidic seals between the interiors of the pressure chambers 422 and the space outside. A pair of fluid ports 428 is in fluidic communication with the pressure chambers 422. In use, pressurized fluid can be applied to the fluid ports 428 to urge the rotary pistons 414 partly out of the pressure chambers 422, and to urge the rotor shaft 412 to rotate in a first direction, e.g., clockwise in this example.

The pressure chamber assembly 420 and the rotor shaft 412 and rotary pistons 414 of the rotary piston assembly may be structurally similar to corresponding components found in to the second actuation section 120 of the actuator 100. In use, the example actuator 400 also functions substantially similarly to the actuator 100 when rotating in a first direction when the rotary pistons 414 are being urged outward from the pressure chambers 422. e.g., clockwise in this example. As will be discussed next, the actuator 400 differs from the actuator 100 in the way that the rotor shaft 412 is made to rotate in a second direction, e.g., counter-clockwise in this example.

To provide actuation in the second direction, the example actuator 400 includes an outer housing 450 with a bore 452. The pressure chamber assembly 420 is formed to fit within the bore 452. The bore 452 is fluidically sealed by a pair of end caps (not shown). With the end caps in place, the bore 452 becomes a pressurizable chamber. Pressurized fluid can flow to and from the bore 452 through a fluid port 454. Pressurized fluid in the bore 452 is separated from fluid in the pressure chambers 422 by the seals 426.

Figure 5:
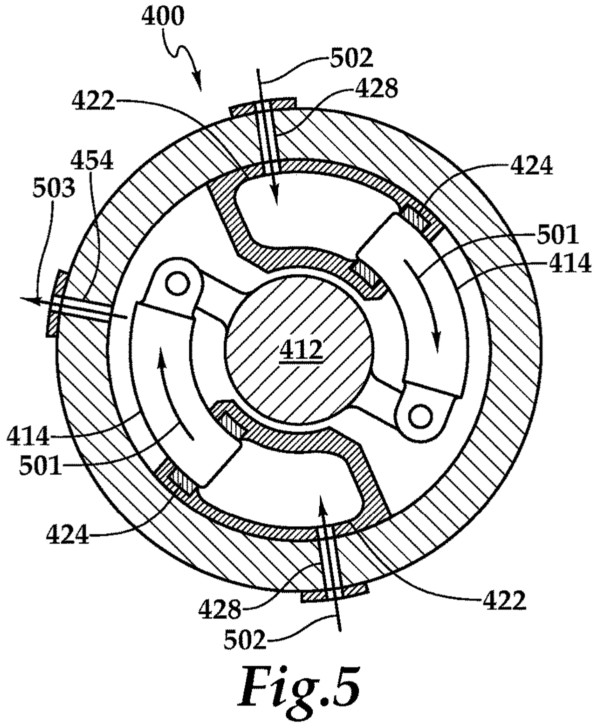
FIGS. 5 and 6 are cross-sectional views of an example rotary piston-type actuator.

Referring now to FIG. 5, the example actuator 400 is shown in a first configuration in which the rotor shaft 412 has been rotated in a first direction, e.g., clockwise, as indicated by the arrows 501. The rotor shaft 412 can be rotated in the first direction by flowing pressurized fluid into the pressure chambers 422 through the fluid ports 428, as indicated by the arrows 502. The pressure within the pressure chambers 422 urges the rotary pistons 414 partly outward from the pressure chambers 422 and into the bore 452. Fluid within the bore 452, separated from the fluid within the pressure chambers 422 by the seals 424 and displaced by the movement of the rotary pistons 414, is urged to flow out the fluid port 454, as indicated by the arrow 503.

Figure 6:
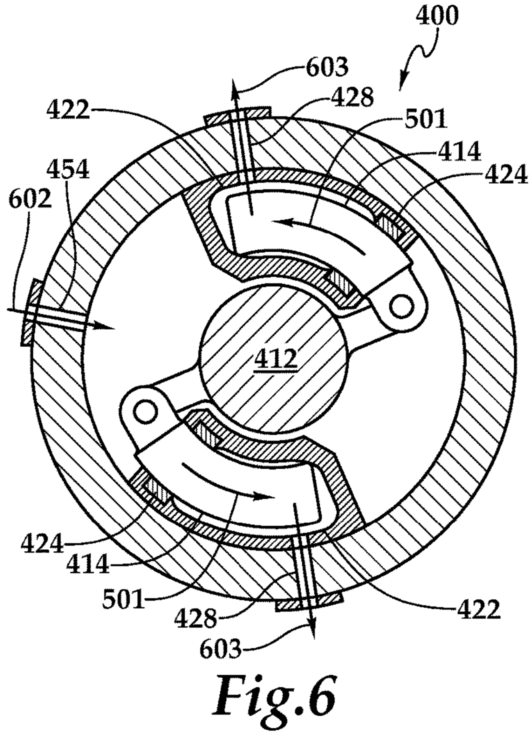

Referring now to FIG. 6, the example actuator 400 is shown in a second configuration in which the rotor shaft 412 has been rotated in a second direction, e.g., counter-clockwise, as indicated by the arrows 601. The rotor shaft 412 can be rotated in the second direction by flowing pressurized fluid into the bore 452 through the fluid port 454, as indicated by the arrow 602. The pressure within the bore 452 urges the rotary pistons 414 partly into the pressure chambers 422 from the bore 452. Fluid within the pressure chambers 422, separated from the fluid within the bore 452 by the seals 424 and displaced by the movement of the rotary pistons 414, is urged to flow out the fluid ports 428, as indicated by the arrows 603. In some embodiments, one or more of the fluid ports 428 and 454 can be oriented radially relative to the axis of the actuator 400, as illustrated in FIGS. 4-6, however in some embodiments one or more of the fluid ports 428 and 454 can be oriented parallel to the axis of the actuator 400 or in any other appropriate orientation.

Figure 7:
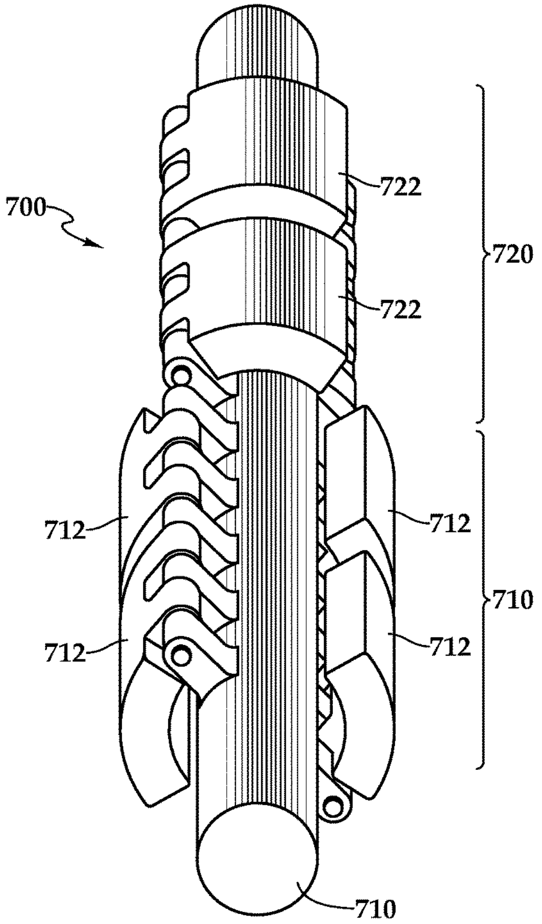
FIG. 7 is a perspective view of another embodiment of a rotary piston-type actuator.

FIG. 7 is a perspective view of another embodiment of a rotary piston assembly 700. In the example actuator 100 of FIG. 1, two opposing pairs of rotary pistons were used, but in other embodiments other numbers and configurations of rotary pistons and pressure chambers can be used. In the example of the assembly 700, a first actuation section 710 includes four rotary pistons 712 cooperatively operable to urge a rotor shaft 701 in a first direction. A second actuation section 720 includes four rotary pistons 722 cooperatively operable to urge the rotor shaft 701 in a second direction.

Although examples using four rotary pistons, e.g., actuator 100, and eight rotary pistons, e.g., assembly 700, have been described, other configurations may exist. In some embodiments, any appropriate number of rotary pistons may be used in cooperation and/or opposition. In some embodiments, opposing rotary pistons may not be segregated into separate actuation sections, e.g., the actuation sections 710 and 720. While cooperative pairs of rotary pistons are used in the examples of actuators 100, 400, and assembly 700, other embodiments exist. For example, clusters of two, three, four, or more cooperative or oppositional rotary pistons and pressure chambers may be arranged radially about a section of a rotor shaft. As will be discussed in the descriptions of FIGS. 8-10, a single rotary piston may be located at a section of a rotor shaft. In some embodiments, cooperative rotary pistons may be interspersed alternatingly with opposing rotary pistons. For example, the rotary pistons 712 may alternate with the rotary pistons 722 along the rotor shaft 701.

Figure 8:
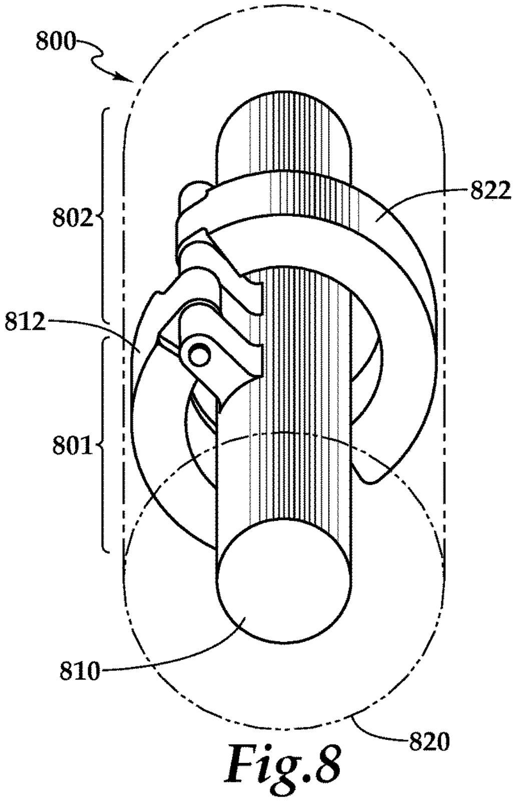
FIG. 8 is a perspective view of another example of a rotary piston-type actuator.

FIG. 8 is a perspective view of another example of a rotary piston-type actuator 800. The actuator 800 differs from the example actuators 100 and 400, and the example assembly 700 in that instead of implementing cooperative pairs of rotary pistons along a rotor shaft, e.g., two of the rotary pistons 250 are located radially about the rotor shaft 210, individual rotary pistons are located along a rotor shaft.

The example actuator 800 includes a rotor shaft 810 and a pressure chamber assembly 820. The actuator 800 includes a first actuation section 801 and a second actuation section 802. In the example actuator 800, the first actuation section 801 is configured to rotate the rotor shaft 810 in a first direction, e.g., clockwise, and the second actuation section 802 is configured to rotate the rotor shaft 810 in a second direction substantially opposite the first direction, e.g., counter-clockwise.

The first actuation section 801 of example actuator 800 includes a rotary piston 812, and the second actuation section 802 includes a rotary piston 822. By implementing a single rotary piston 812, 822 at a given longitudinal position along the rotor shaft 810, a relatively greater range of rotary travel may be achieved compared to actuators that use pairs of rotary pistons at a given longitudinal position along the rotary piston assembly, e.g., the actuator 100. In some embodiments, the actuator 800 can rotate the rotor shaft 810 about 145 degrees total.

In some embodiments, the use of multiple rotary pistons 812, 822 along the rotor shaft 810 can reduce distortion of the pressure chamber assembly 820, e.g., reduce bowing out under high pressure. In some embodiments, the use of multiple rotary pistons 812, 822 along the rotor shaft 810 can provide additional degrees of freedom for each piston 812, 822. In some embodiments, the use of multiple rotary pistons 812, 822 along the rotor shaft 810 can reduce alignment issues encountered during assembly or operation. In some embodiments, the use of multiple rotary pistons 812, 822 along the rotor shaft 810 can reduce the effects of side loading of the rotor shaft 810.

Figure 9:
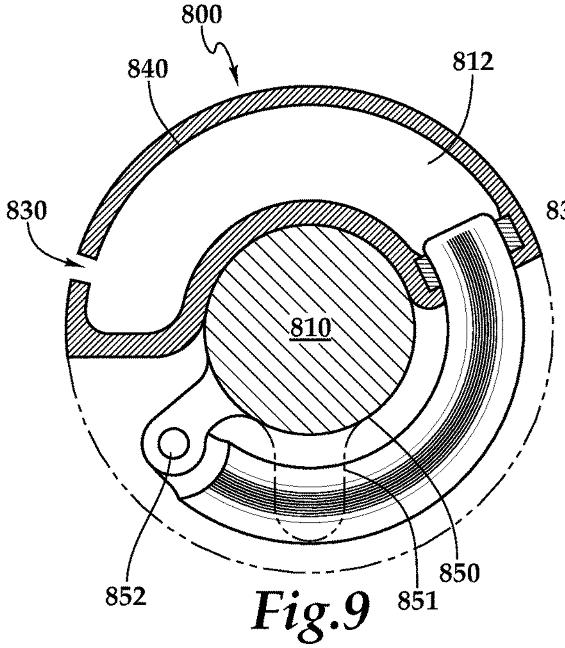
FIGS. 9 and 10 show and example rotary piston-type actuator in example extended and retracted configurations.

FIG. 9 shows the example actuator 800 with the rotary piston 812 in a substantially extended configuration. A pressurized fluid is applied to a fluid port 830 to pressurize an arcuate pressure chamber 840 formed in the pressure chamber assembly 820. Pressure in the pressure chamber 840 urges the rotary piston 812 partly outward, urging the rotor shaft 810 to rotate in a first direction, e.g., clockwise.

Figure 10:
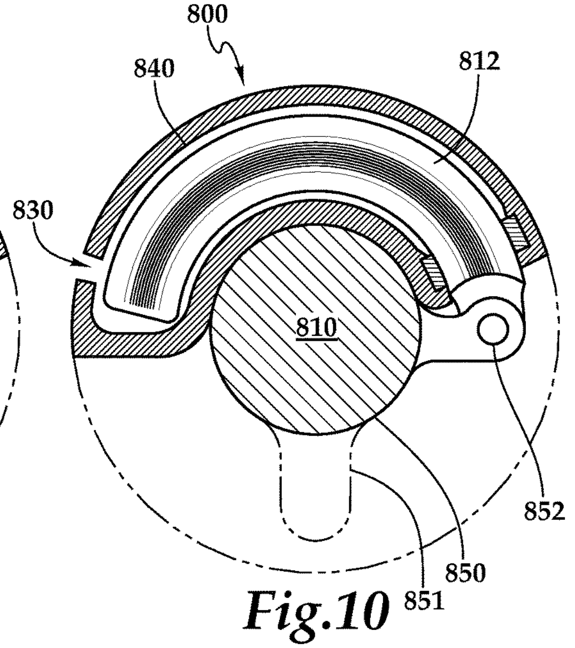

FIG. 10 shows the example actuator 800 with the rotary piston 812 in a substantially retracted configuration. Mechanical rotation of the rotor shaft 810, e.g., pressurization of the actuation section 820, urges the rotary piston 812 partly inward, e.g., clockwise. Fluid in the pressure chamber 840 displaced by the rotary piston 812 flows out through the fluid port 830.

The example actuator 800 can be assembled by inserting the rotary piston 812 into the pressure chamber 840. Then the rotor shaft 810 can be inserted longitudinally through a bore 850 and a keyway 851. The rotary piston 812 is connected to the rotor shaft 810 by a connecting pin 852.

Figure 11:
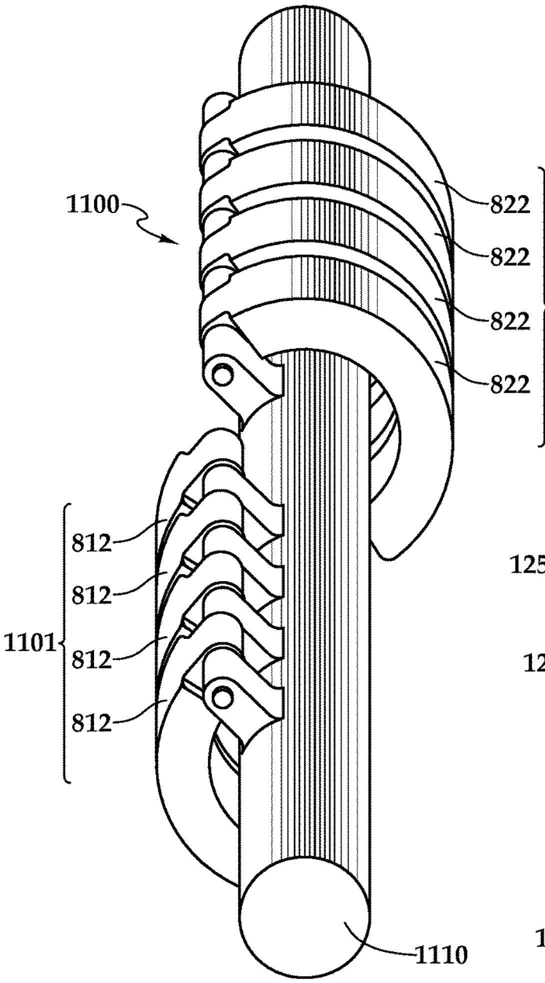
FIG. 11 is a perspective view of another example of a rotary piston-type actuator.

FIG. 11 is a perspective view of another example of a rotary piston-type actuator 1100. In general, the actuator 1100 is similar to the example actuator 800, except multiple rotary pistons are used in each actuation section.

The example actuator 1100 includes a rotary piston assembly 1110 and a pressure chamber assembly 1120. The actuator 1100 includes a first actuation section 1101 and a second actuation section 1102. In the example of actuator 1100, the first actuation section 1101 is configured to rotate the rotary piston assembly 1110 in a first direction, e.g., clockwise, and the second actuation section 1102 is configured to rotate the rotary piston assembly 1110 in a second direction substantially opposite the first direction, e.g., counter-clockwise.

The first actuation section 1101 of example actuator 1100 includes a collection of rotary pistons 812, and the second actuation section 1102 includes a collection of rotary pistons 822. By implementing individual rotary pistons 812, 822 at various longitudinal positions along the rotary piston assembly 1110, a range of rotary travel similar to the actuator 800 may be achieved. In some embodiments, the actuator 1100 can rotate the rotor shaft 1110 about 60 degrees total.

In some embodiments, the use of the collection of rotary pistons 812 may provide mechanical advantages in some applications. For example, the use of multiple rotary pistons 812 may reduce stress or deflection of the rotary piston assembly, may reduce wear of the seal assemblies, or may provide more degrees of freedom. In another example, providing partitions, e.g., webbing, between chambers can add strength to the pressure chamber assembly 1120 and can reduce bowing out of the pressure chamber assembly 1120 under high pressure. In some embodiments, placement of an end tab on the rotor shaft assembly 1110 can reduce cantilever effects experienced by the actuator 800 while under load, e.g., less stress or bending.

Figure 12:
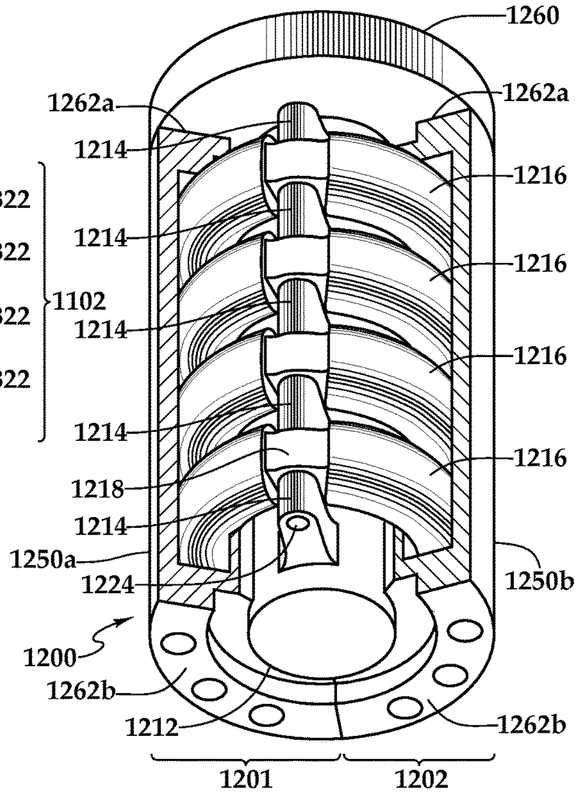
FIGS. 12-14 are perspective and cross-sectional views of another example rotary piston-type actuator.
Figure 14:
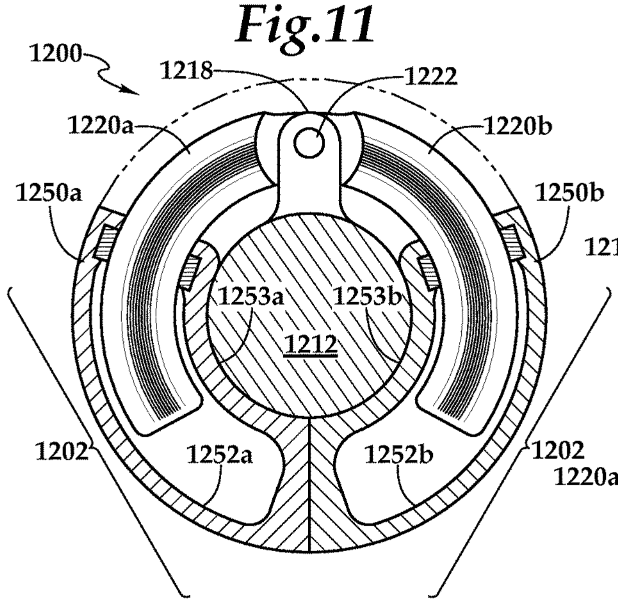
Figure 13:
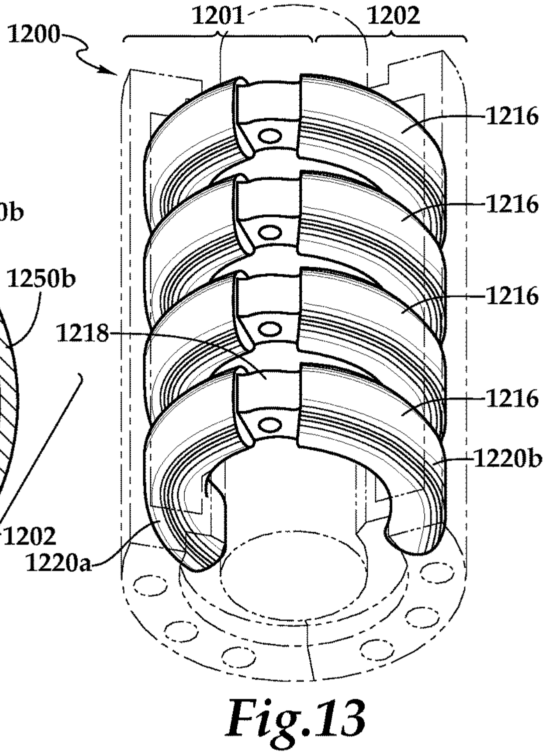

FIGS. 12-14 are perspective and cross-sectional views of another example rotary piston-type actuator 1200. The actuator 1200 includes a rotary piston assembly 1210, a first actuation section 1201, and a second actuation section 1202.

The rotary piston assembly 1210 of example actuator 1200 includes a rotor shaft 1212, a collection of rotor arms 1214, and a collection of dual rotary pistons 1216. Each of the dual rotary pistons 1216 includes a connector section 1218 a piston end 1220*a* and a piston end 1220*b*. The piston ends 1220*a*-1220*b* are arcuate in shape, and are oriented opposite to each other in a generally semicircular arrangement, and are joined at the connector section 1218. A bore 1222 is formed in the connector section 1218 and is oriented substantially parallel to the axis of the semicircle formed by the piston ends 1220*a*-1220*b*. The bore 1222 is sized to accommodate a connector pin (not shown) that is passed through the bore 1222 and a collection of bores 1224 formed in the rotor arms 1213 to secure each of the dual rotary pistons 1216 to the rotor shaft 1212.

The first actuation section 1201 of example actuator 1200 includes a first pressure chamber assembly 1250*a*, and the second actuation section 1202 includes a second pressure chamber assembly 1250*b*. The first pressure chamber assembly 1250*a* includes a collection of pressure chambers 1252*a* formed as arcuate cavities in the first pressure chamber assembly 1250*a*. The second pressure chamber assembly 1250*b* includes a collection of pressure chambers 1252*b* formed as arcuate cavities in the first pressure chamber assembly 1250*b*. When the pressure chamber assemblies 1250*a*-1250*b* are assembled into the actuator 1200, each of the pressure chambers 1252*a* lies generally in a plane with a corresponding one of the pressure chambers 1252*b*, such that a pressure chamber 1252*a* and a pressure chamber 1252*b* occupy two semicircular regions about a central axis. A semicircular bore 1253*a* and a semicircular bore 1253*b* substantially align to accommodate the rotor shaft 1212.

Each of the pressure chambers 1252*a*-1252*b* of example actuator 1200 includes an open end 1254 and a seal assembly 1256. The open ends 1254 are formed to accommodate the insertion of the piston ends 1220*a*-1220*b*. The seal assemblies 1256 contact the inner walls of the pressure chambers 1252*a*-1252*b* and the outer surfaces of the piston ends 1220*a*-1220*b* to form a fluidic seal.

The rotary piston assembly 1210 of example actuator 1200 can be assembled by aligning the bores 1222 of the dual rotary pistons 1216 with the bores 1224 of the rotor arms 1214. The connector pin (not shown) is passed through the bores 1222 and 1224 and secured longitudinally by retaining fasteners.

The example actuator 1200 can be assembled by positioning the rotor shaft 1212 substantially adjacent to the semicircular bore 1253*a* and rotating it to insert the piston ends 1220*a* substantially fully into the pressure chambers 1252*a*. The second pressure chamber 1252*b* is positioned adjacent to the first pressure chamber 1252*a* such that the semicircular bore 1253*b* is positioned substantially adjacent to the rotor shaft 1212. The rotary piston assembly 1210 is then rotated to partly insert the piston ends 1220*b* into the pressure chambers 1252*b*. An end cap 1260 is fastened to the longitudinal ends 1262*a* of the pressure chambers 1252*a*-1252*b*. A second end cap (not shown) is fastened to the longitudinal ends 1262*b* of the pressure chambers 1252*a*-1252*b*. The end caps substantially maintain the positions of the rotary piston assembly 1210 and the pressure chambers 1252*a*-1252*b* relative to each other. In some embodiments, the actuator 1200 can provide about 90 degrees of total rotational stroke.

In operation, pressurized fluid is applied to the pressure chambers 1252*a* of example actuator 1200 to rotate the rotary piston assembly 1210 in a first direction, e.g., clockwise. Pressurized fluid is applied to the pressure chambers 1252*b* to rotate the rotary piston assembly 1210 in a second direction, e.g., counter-clockwise.

Figure 15:
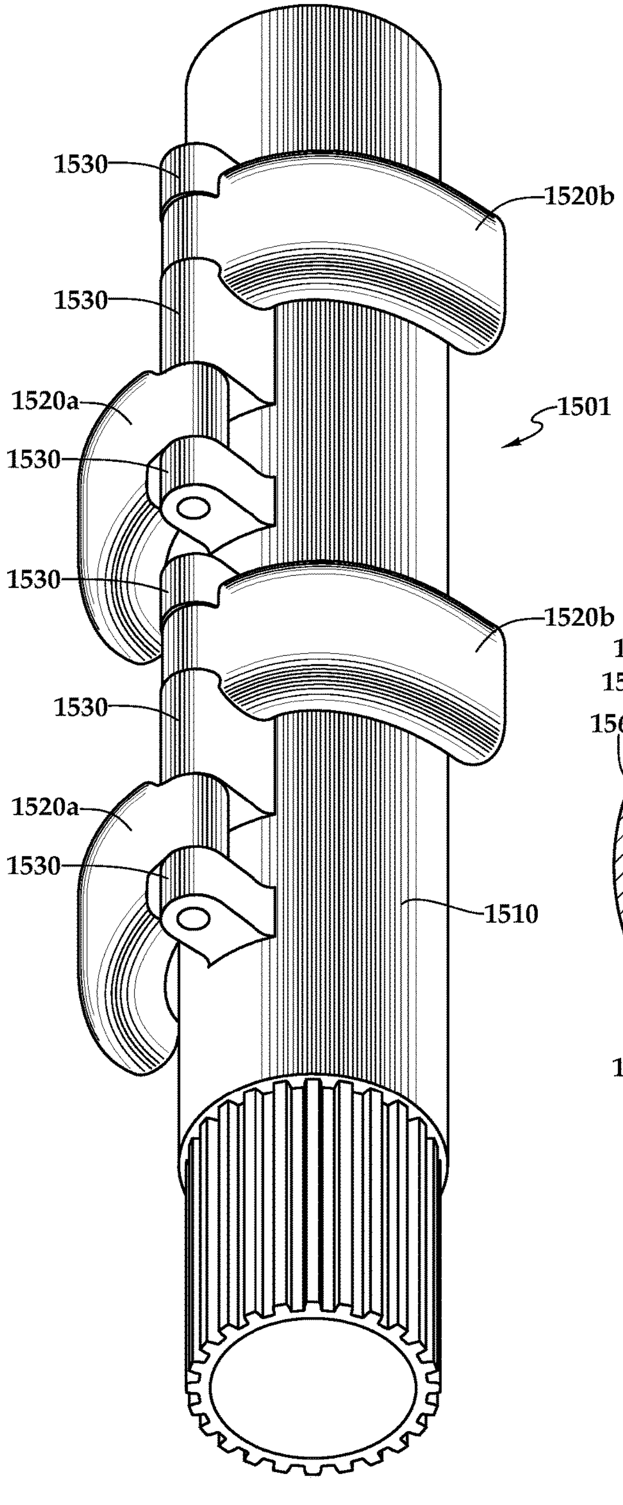
FIGS. 15 and 16 are perspective and cross-sectional views of another example rotary piston-type actuator that includes another example rotary piston assembly.
Figure 16:
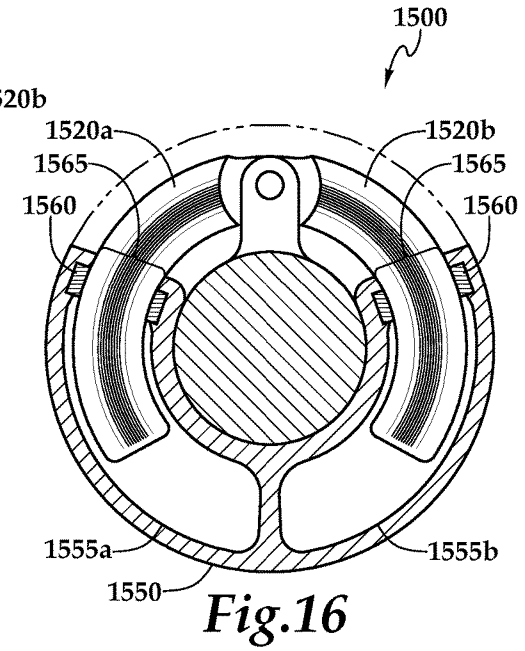

FIGS. 15 and 16 are perspective and cross-sectional views of another example rotary piston-type actuator 1500 that includes another example rotary piston assembly 1501. In some embodiments, the assembly 1501 can be an alternative embodiment of the rotary piston assembly 200 of FIG. 2.

The assembly 1501 of example actuator 1500 includes a rotor shaft 1510 connected to a collection of rotary pistons 1520*a* and a collection of rotary pistons 1520*b* by a collection of rotor arms 1530 and one or more connector pins (not shown). The rotary pistons 1520*a* and 1520*b* are arranged along the rotor shaft 1510 in a generally alternating pattern, e.g., one rotary piston 1520*a*, one rotary piston 1520*b*, one rotary piston 1520*a*, one rotary piston 1520*b*. In some embodiments, the rotary pistons 1520*a* and 1520*b* may be arranged along the rotor shaft 1510 in a generally intermeshed pattern, e.g., one rotary piston 1520*a* and one rotary piston 1520*b* rotationally parallel to each other, with connector portions formed to be arranged side-by-side or with the connector portion of rotary piston 1520*a* formed to one or more male protrusions and/or one or more female recesses to accommodate one or more corresponding male protrusions and/or one or more corresponding female recesses formed in the connector portion of the rotary piston 1520*b*.

Referring to FIG. 16, a pressure chamber assembly 1550 of example actuator 1500 includes a collection of arcuate pressure chambers 1555*a* and a collection of arcuate pressure chambers 1555*b*. The pressure chambers 1555*a* and 1555*b* are arranged in a generally alternating pattern corresponding to the alternating pattern of the rotary pistons 1520*a*-1520*b*. The rotary pistons 1520*a*-1520*b* extend partly into the pressure chambers 1555*a*-1555*b*. A seal assembly 1560 is positioned about an open end 1565 of each of the pressure chambers 1555*a*-1555*b* to form fluidic seals between the inner walls of the pressure chambers 1555*a*-1555*b* and the rotary pistons 1520*a*-1520*b*.

In use, pressurized fluid can be alternatingly provided to the pressure chambers 1555*a* and 1555*b* of example actuator 1500 to urge the rotary piston assembly 1501 to rotate partly clockwise and counterclockwise. In some embodiments, the actuator 1500 can rotate the rotor shaft 1510 about 92 degrees total.

Figure 17:
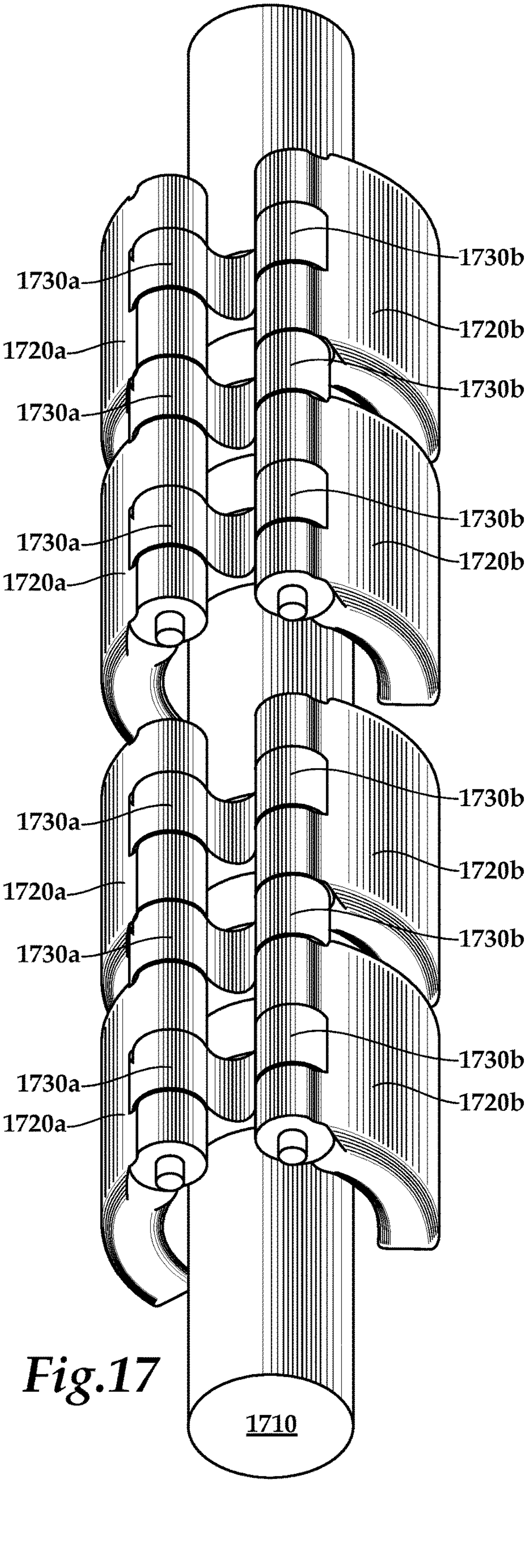
FIGS. 17 and 18 are perspective and cross-sectional views of another example rotary piston-type actuator that includes another example rotary piston assembly.
Figure 18:
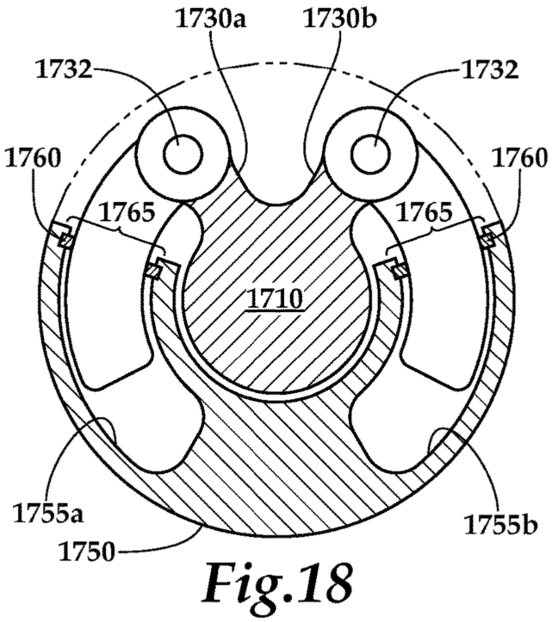

FIGS. 17 and 18 are perspective and cross-sectional views of another example rotary piston-type actuator 1700 that includes another example rotary piston assembly 1701. In some embodiments, the assembly 1701 can be an alternative embodiment of the rotary piston assembly 200 of FIG. 2 or the assembly 1200 of FIG. 12.

The assembly 1701 of example actuator 1700 includes a rotor shaft 1710 connected to a collection of rotary pistons 1720*a* by a collection of rotor arms 1730*a* and one or more connector pins 1732. The rotor shaft 1710 is also connected to a collection of rotary pistons 1720*b* by a collection of rotor arms 1730*b* and one or more connector pins 1732. The rotary pistons 1720*a* and 1720*b* are arranged along the rotor shaft 1710 in a generally opposing, symmetrical pattern, e.g., one rotary piston 1720*a* is paired with one rotary piston 1720*b* at various positions along the length of the assembly 1701.

Referring to FIG. 18, a pressure chamber assembly 1750 of example actuator 1700 includes a collection of arcuate pressure chambers 1755*a* and a collection of arcuate pressure chambers 1755*b*. The pressure chambers 1755*a* and 1755*b* are arranged in a generally opposing, symmetrical pattern corresponding to the symmetrical arrangement of the rotary pistons 1720*a*-1720*b*. The rotary pistons 1720*a*-1720*b* extend partly into the pressure chambers 1755*a*-1755*b*. A seal assembly 1760 is positioned about an open end 1765 of each of the pressure chambers 1755*a*-1755*b* to form fluidic seals between the inner walls of the pressure chambers 1755*a*-1755*b* and the rotary pistons 1720*a*-1720*b*.

In use, pressurized fluid can be alternatingly provided to the pressure chambers 1755*a* and 1755*b* of example actuator 1700 to urge the rotary piston assembly 1701 to rotate partly clockwise and counterclockwise. In some embodiments, the actuator 1700 can rotate the rotor shaft 1710 about 52 degrees total.

Figure 19:
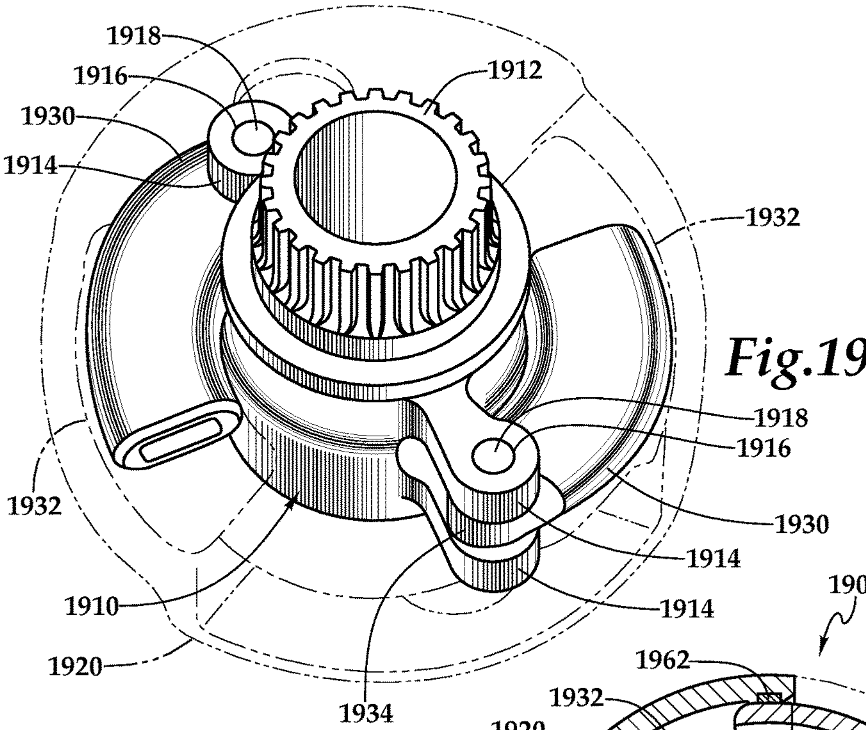
FIGS. 19 and 20 are perspective and cross-sectional views of another example rotary piston-type actuator.
Figure 20:
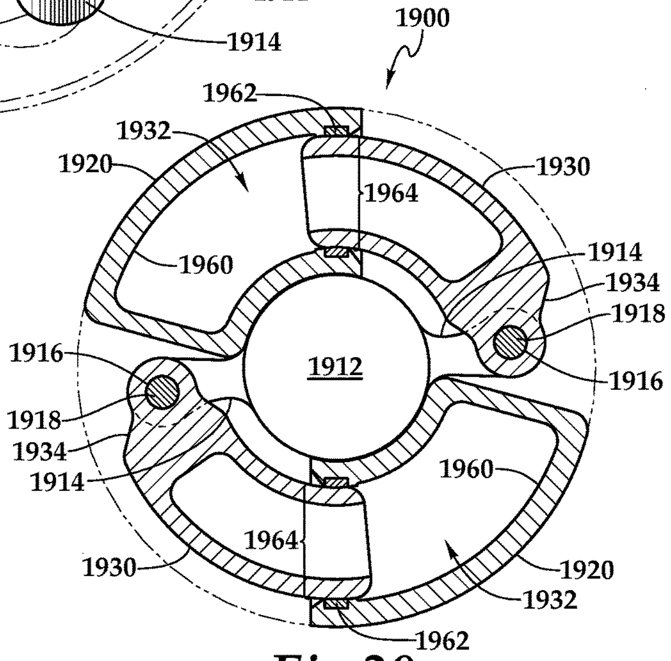

FIGS. 19 and 20 are perspective and cross-sectional views of another example rotary piston-type actuator 1900. Whereas the actuators described previously, e.g., the example actuator 100 of FIG. 1, are generally elongated and cylindrical, the actuator 1900 is comparatively flatter and more disk-shaped.

Referring to FIG. 19, a perspective view of the example rotary piston-type actuator 1900 is shown. The actuator 1900 includes a rotary piston assembly 1910 and a pressure chamber assembly 1920. The rotary piston assembly 1910 includes a rotor shaft 1912. A collection of rotor arms 1914 extend radially from the rotor shaft 1912, the distal end of each rotor arm 1914 including a bore 1916 aligned substantially parallel with the axis of the rotor shaft 1912 and sized to accommodate one of a collection of connector pins 1918.

The rotary piston assembly 1910 of example actuator 1900 includes a pair of rotary pistons 1930 arranged substantially symmetrically opposite each other across the rotor shaft 1912. In the example of the actuator 1900, the rotary pistons 1930 are both oriented in the same rotational direction, e.g., the rotary pistons 1930 cooperatively push in the same rotational direction. In some embodiments, a return force may be provided to rotate the rotary piston assembly 1910 in the direction of the rotary pistons 1930. For example, the rotor shaft 1912 may be coupled to a load that resists the forces provided by the rotary pistons 1930, such as a load under gravitational pull, a load exposed to wind or water resistance, a return spring, or any other appropriate load that can rotate the rotary piston assembly. In some embodiments, the actuator 1900 can include a pressurizable outer housing over the pressure chamber assembly 1920 to provide a back-drive operation, e.g., similar to the function provided by the outer housing 450 in FIG. 4. In some embodiments, the actuator 1900 can be rotationally coupled to an oppositely oriented actuator 1900 that can provide a back-drive operation.

In some embodiments, the rotary pistons 1930 can be oriented in opposite rotational directions, e.g., the rotary pistons 1930 can oppose each other push in the opposite rotational directions to provide bidirectional motion control. In some embodiments, the actuator 100 can rotate the rotor shaft about 60 degrees total.

Each of the rotary pistons 1930 of example actuator 1900 includes a piston end 1932 and one or more connector arms 1934. The piston end 1932 is formed to have a generally semi-circular body having a substantially smooth surface. Each of the connector arms 1934 includes a bore 1936 (see FIGS. 21B and 21C) substantially aligned with the axis of the semi-circular body of the piston end 1932 and sized to accommodate one of the connector pins 1918.

Each of the rotary pistons 1930 of example actuator 1900 is assembled to the rotor shaft 1912 by aligning the connector arms 1934 with the rotor arms 1914 such that the bores 1916 of the rotor arms 1914 align with the bores 1936. The connector pins 1918 are inserted through the aligned bores to create hinged connections between the pistons 1930 and the rotor shaft 1912. Each connector pin 1916 is slightly longer than the aligned bores. About the circumferential periphery of each end of each connector pin 1916 that extends beyond the aligned bores is a circumferential recess (not shown) that can accommodate a retaining fastener (not shown), e.g., a snap ring or spiral ring.

Referring now to FIG. 20 a cross-sectional view of the example rotary piston-type actuator 1900 is shown. The illustrated example shows the rotary pistons 1930 partly inserted into a corresponding pressure chamber 1960 formed as an arcuate cavity in the pressure chamber assembly 1920.

Each pressure chamber 1960 of example actuator 1900 includes a seal assembly 1962 about the interior surface of the pressure chamber 1960 at an open end 1964. In some embodiments, the seal assembly 1962 can be a circular or semi-circular sealing geometry retained on all sides in a standard seal groove.

When the rotary pistons 1930 of example actuator 1900 are inserted through the open ends 1964, each of the seal assemblies 1962 contacts the interior surface of the pressure chamber 1960 and the substantially smooth surface of the piston end 1932 to form a substantially pressure-sealed region within the pressure chamber 1960. Each of the pressure chambers 1960 each include a fluid port (not shown) formed through the pressure chamber assembly 1920, through with pressurized fluid may flow.

Upon introduction of pressurized fluid, e.g., hydraulic oil, water, air, gas, into the pressure chambers 1960 of example actuator 1900, the pressure differential between the interior of the pressure chambers 1960 and the ambient conditions outside the pressure chambers 1960 causes the piston ends 1932 to be urged outward from the pressure chambers 1960. As the piston ends 1932 are urged outward, the pistons 1930 urge the rotary piston assembly 1910 to rotate.

Figure 21A:
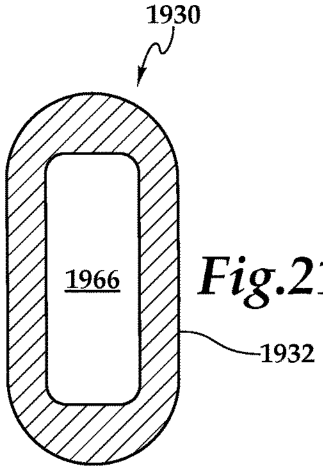
FIGS. 21A-21C are cross-sectional and perspective views of an example rotary piston.
Figure 21B:
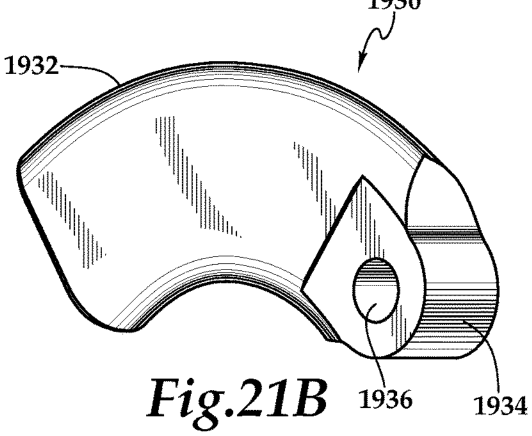
Figure 21C:
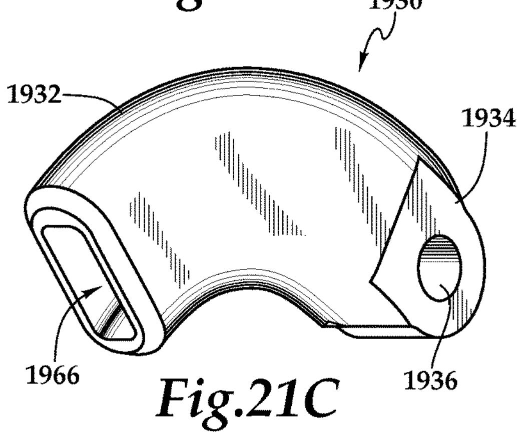

In the illustrated example actuator 1900, each of the rotary pistons 1930 includes a cavity 1966. FIGS. 21A-21C provide additional cross-sectional and perspective views of one of the rotary pistons 1930. Referring to FIG. 21A, a cross-section the rotary piston 1930, taken across a section of the piston end 1932 is shown. The cavity 1966 is formed within the piston end 1932. Referring to FIG. 21B, the connector arm 1934 and the bore 1936 is shown in perspective. FIG. 21C features a perspective view of the cavity 1966.

In some embodiments, the cavity 1966 may be omitted. For example, the piston end 1932 may be solid in cross-section. In some embodiments, the cavity 1966 may be formed to reduce the mass of the rotary piston 1930 and the mass of the actuator 1900. For example, the actuator 1900 may be implemented in an aircraft application, where weight may play a role in actuator selection. In some embodiments, the cavity 1966 may reduce wear on seal assemblies, such as the seal assembly 320 of FIG. 3. For example, by reducing the mass of the rotary piston 1930, the amount of force the piston end 1932 exerts upon the corresponding seal assembly may be reduced when the mass of the rotary piston is accelerated, e.g., by gravity or G-forces.

In some embodiments, the cavity 1966 may be substantially hollow in cross-section, and include one or more structural members, e.g., webs, within the hollow space. For example, structural cross-members may extend across the cavity of a hollow piston to reduce the amount by which the piston may distort, e.g., bowing out, when exposed to a high pressure differential across the seal assembly.

Figure 22:
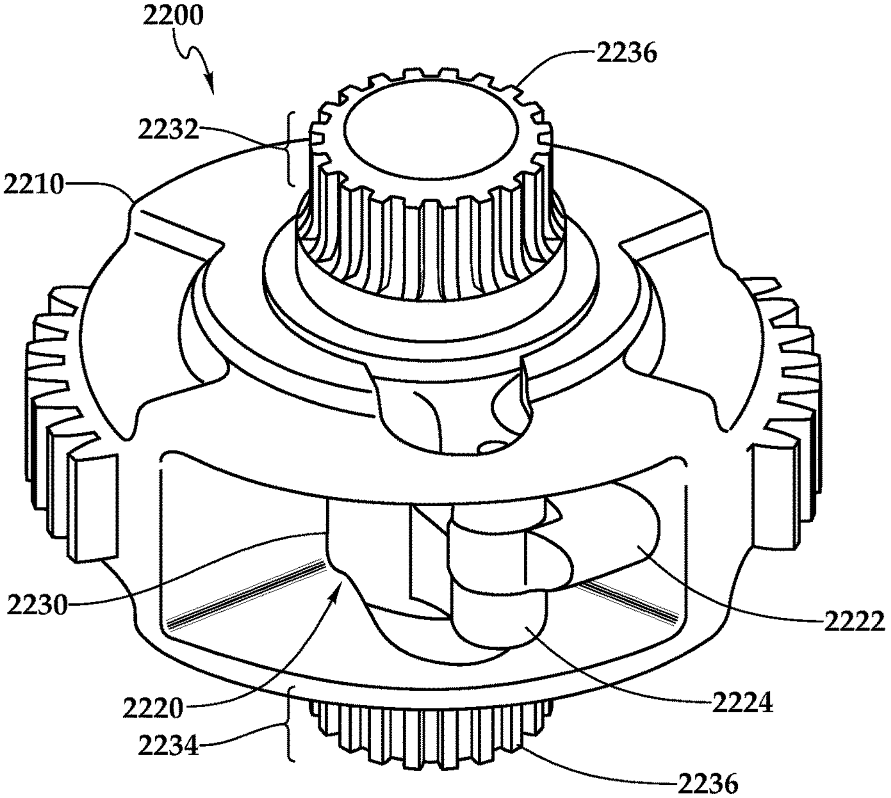
FIGS. 22 and 23 illustrate a comparison of two example rotor shaft embodiments.
Figure 23:
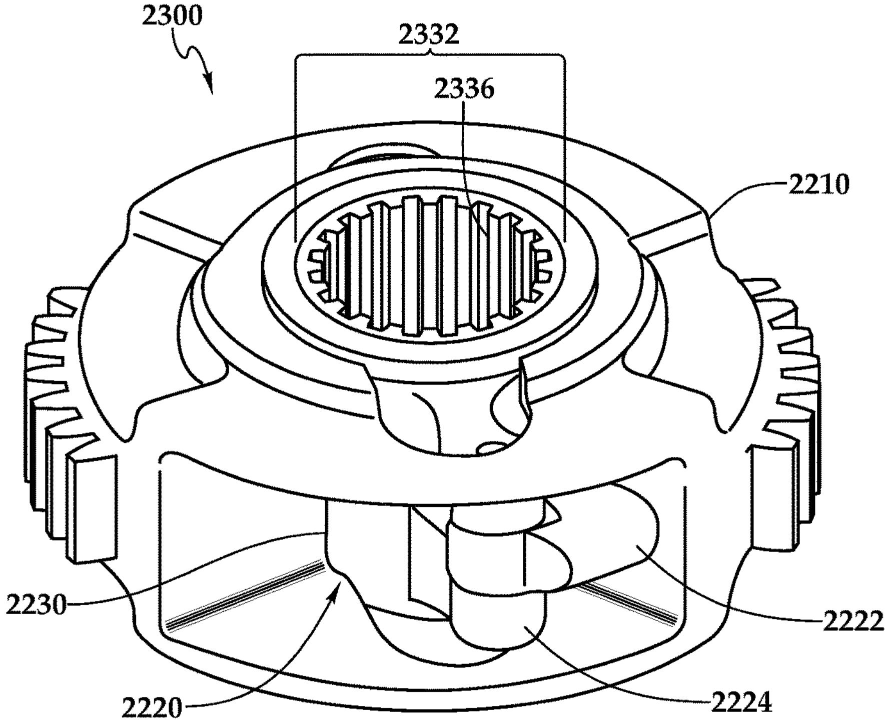

FIGS. 22 and 23 illustrate a comparison of two example rotor shaft embodiments. FIG. 22 is a perspective view of an example rotary piston-type actuator 2200. In some embodiments, the example actuator 2200 can be the example actuator 1900.

The example actuator 2200 includes a pressure chamber assembly 2210 and a rotary piston assembly 2220. The rotary piston assembly 2220 includes at least one rotary piston 2222 and one or more rotor arms 2224. The rotor arms 2224 extend radially from a rotor shaft 2230.

The rotor shaft 2230 of example actuator includes an output section 2232 and an output section 2234 that extend longitudinally from the pressure chamber assembly 2210. The output sections 2232-2234 include a collection of splines 2236 extending radially from the circumferential periphery of the output sections 2232-2234. In some implementations, the output section 2232 and/or 2234 may be inserted into a correspondingly formed splined assembly to rotationally couple the rotor shaft 2230 to other mechanisms. For example, by rotationally coupling the output section 2232 and/or 2234 to an external assembly, the rotation of the rotary piston assembly 2220 may be transferred to urge the rotation of the external assembly.

FIG. 23 is a perspective view of another example rotary piston-type actuator 2300. The actuator 2300 includes the pressure chamber assembly 2210 and a rotary piston assembly 2320. The rotary piston assembly 2320 includes at least one of the rotary pistons 2222 and one or more of the rotor arms 2224. The rotor arms 2224 extend radially from a rotor shaft 2330.

The rotor shaft 2330 of example actuator 2300 includes a bore 2332 formed longitudinally along the axis of the rotor shaft 2330. The rotor shaft 2330 includes a collection of splines 2336 extending radially inward from the circumferential periphery of the bore 2332. In some embodiments, a correspondingly formed splined assembly may be inserted into the bore 2332 to rotationally couple the rotor shaft 2330 to other mechanisms.

Figure 24:
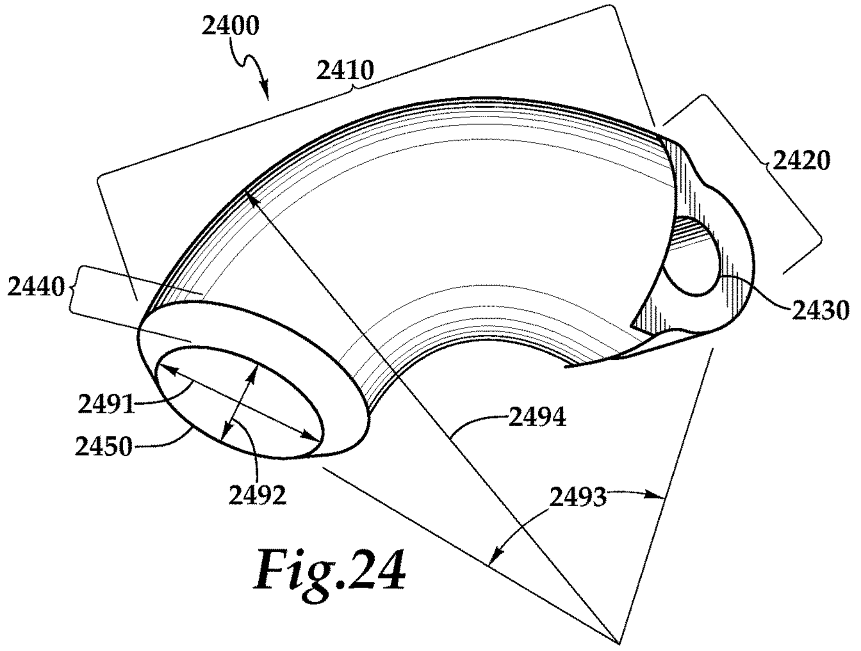
FIG. 24 is a perspective view of another example rotary piston.

FIG. 24 is a perspective view of another example rotary piston 2400. In some embodiments, the rotary piston 2400 can be the rotary piston 250, 260, 414, 712, 812, 822, 1530*a*, 1530*b*, 1730*a*, 1730*b*, 1930 or 2222.

The example rotary piston 2400 includes a piston end 2410 and a connector section 2420. The connector section 2420 includes a bore 2430 formed to accommodate a connector pin, e.g., the connector pin 214.

The piston end 2410 of example actuator 2400 includes an end taper 2440. The end taper 2440 is formed about the periphery of a terminal end 2450 of the piston end 2410. The end taper 2440 is formed at a radially inward angle starting at the outer periphery of the piston end 2410 and ending at the terminal end 2450. In some implementations, the end taper 2440 can be formed to ease the process of inserting the rotary piston 2400 into a pressure chamber, e.g., the pressure chamber 310.

The piston end 2410 of example actuator 2400 is substantially smooth. In some embodiments, the smooth surface of the piston end 2410 can provide a surface that can be contacted by a seal assembly. For example, the seal assembly 320 can contact the smooth surface of the piston end 2410 to form part of a fluidic seal, reducing the need to form a smooth, fluidically sealable surface on the interior walls of the pressure chamber 310.

In the illustrated example, the rotary piston 2400 is shown as having a generally solid circular cross-section, whereas the rotary pistons piston 250, 260, 414, 712, 812, 822, 1530*a*, 1530*b*, 1730*a*, 1730*b*, 1930 or 2222 have been illustrated as having various generally rectangular, elliptical, and other shapes, both solid and hollow, in cross section. In some embodiments, the cross sectional dimensions of the rotary piston 2400, as generally indicated by the arrows 2491 and 2492, can be adapted to any appropriate shape, e.g., square, rectangular, ovoid, elliptical, circular, and other shapes, both solid and hollow, in cross section. In some embodiments, the arc of the rotary piston 2400, as generally indicated by the angle 2493, can be adapted to any appropriate length. In some embodiments, the radius of the rotary piston 2400, as generally indicated by the line 2494, can be adapted to any appropriate radius. In some embodiments, the piston end 2410 can be substantially solid, substantially hollow, or can include any appropriate hollow formation. In some embodiments, any of the previously mentioned forms of the piston end 2410 can also be used as the piston ends 1220*a* and/or 1220*b* of the dual rotary pistons 1216 of FIG. 12.

Figure 25:
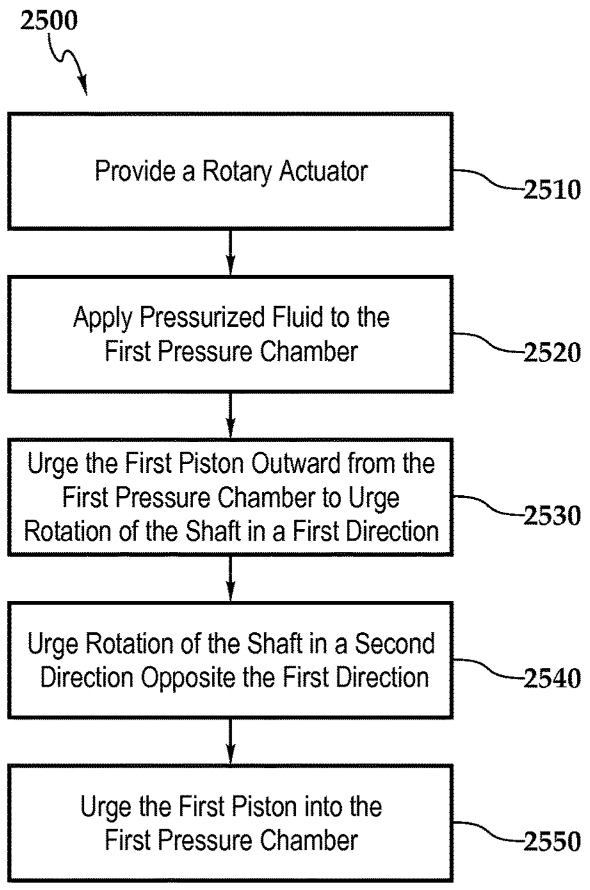
FIG. 25 is a flow diagram of an example process for performing rotary actuation.

FIG. 25 is a flow diagram of an example process 2500 for performing rotary actuation. In some implementations, the process 2500 can be performed by the rotary piston-type actuators 100, 400, 700, 800, 1200, 1500, 1700, 1900, 2200, 2300, and/or 2600 which will be discussed in the descriptions of FIGS. 26-28.

At 2510, a rotary actuator is provided. The rotary actuator of example actuator 2500 includes a first housing defining a first arcuate chamber including a first cavity, a first fluid port in fluid communication with the first cavity, an open end, and a first seal disposed about an interior surface of the open end, a rotor assembly rotatably journaled in the first housing and including a rotary output shaft and a first rotor arm extending radially outward from the rotary output shaft, an arcuate-shaped first piston disposed in the first housing for reciprocal movement in the first arcuate chamber through the open end. The first seal, the first cavity, and the first piston define a first pressure chamber, and a first connector, coupling a first end of the first piston to the first rotor arm. For example, the actuator 100 includes the components of the pressure chamber assembly 300 and the rotary piston assembly 200 included in the actuation section 120.

At 2520, a pressurized fluid is applied to the first pressure chamber. For example, pressurized fluid can be flowed through the fluid port 320 into the pressure chamber 310.

At 2530, the first piston is urged partially outward from the first pressure chamber to urge rotation of the rotary output shaft in a first direction. For example, a volume of pressurized fluid flowed into the pressure chamber 310 will displace a similar volume of the rotary piston 260, causing the rotary piston 260 to be partly urged out of the pressure cavity 310, which in turn will cause the rotor shaft 210 to rotate clockwise.

At 2540, the rotary output shaft is rotated in a second direction opposite that of the first direction. For example, the rotor shaft 210 can be rotated counter-clockwise by an external force, such as another mechanism, a torque-providing load, a return spring, or any other appropriate source of rotational torque.

At 2550, the first piston is urged partially into the first pressure chamber to urge pressurized fluid out the first fluid port. For example, the rotary piston 260 can be pushed into the pressure chamber 310, and the volume of the piston end 252 extending into the pressure chamber 310 will displace a similar volume of fluid, causing it to flow out the fluid port 312.

In some embodiments, the example process 2500 can be used to provide substantially constant power over stroke to a connected mechanism. For example, as the actuator 100 rotates, there may be substantially little position-dependent variation in the torque delivered to a connected load.

In some embodiments, the first housing further defines a second arcuate chamber comprising a second cavity, a second fluid port in fluid communication with the second cavity, and a second seal disposed about an interior surface of the open end, the rotor assembly also includes a second rotor arm, the rotary actuator also includes an arcuate-shaped second piston disposed in said housing for reciprocal movement in the second arcuate chamber, wherein the second seal, the second cavity, and the second piston define a second pressure chamber, and a second connector coupling a first end of the second piston to the second rotor arm. For example, the actuator 100 includes the components of the pressure chamber assembly 300 and the rotary piston assembly 200 included in the actuation section 110.

In some embodiments, the second piston can be oriented in the same rotational direction as the first piston. For example, the two pistons 260 are oriented to operate cooperatively in the same rotational direction. In some embodiments, the second piston can be oriented in the opposite rotational direction as the first piston. For example, the rotary pistons 250 are oriented to operate in the opposite rotational direction relative to the rotary pistons 260.

In some embodiments, the actuator can include a second housing and disposed about the first housing and having a second fluid port, wherein the first housing, the second housing, the seal, and the first piston define a second pressure chamber. For example, the actuator 400 includes the outer housing 450 that substantially surrounds the pressure chamber assembly 420. Pressurized fluid in the bore 452 is separated from fluid in the pressure chambers 422 by the seals 426.

In some implementations, rotating the rotary output shaft in a second direction opposite that of the first direction can include applying pressurized fluid to the second pressure chamber, and urging the second piston partially outward from the second pressure chamber to urge rotation of the rotary output shaft in a second direction opposite from the first direction. For example, pressurized fluid can be applied to the pressure chambers 310 of the first actuation section 110 to urge the rotary pistons 260 outward, causing the rotor shaft 210 to rotate counter-clockwise.

In some implementations, rotating the rotary output shaft in a second direction opposite that of the first direction can include applying pressurized fluid to the second pressure chamber, and urging the first piston partially into the first pressure chamber to urge rotation of the rotary output shaft in a second direction opposite from the first direction. For example, pressurized fluid can be flowed into the bore 452 at a pressure higher than that of fluid in the pressure chambers 422, causing the rotary pistons 414 to move into the pressure chambers 422 and cause the rotor shaft 412 to rotate counter-clockwise.

In some implementations, rotation of the rotary output shaft can urge rotation of the housing. For example, the rotary output shaft 412 can be held rotationally stationary and the housing 450 can be allowed to rotate, and application of pressurized fluid in the pressure chambers 422 can urge the rotary pistons 414 out of the pressure chambers 422, causing the housing 450 to rotate about the rotary output shaft 412.

Figure 26:
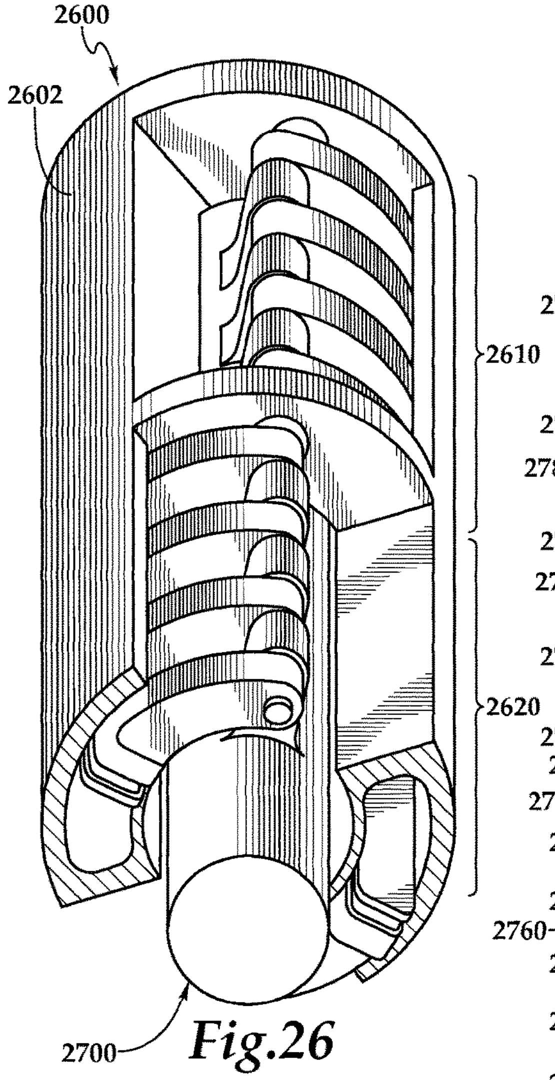
FIG. 26 is a perspective view of another example rotary piston-type actuator.
Figure 27:
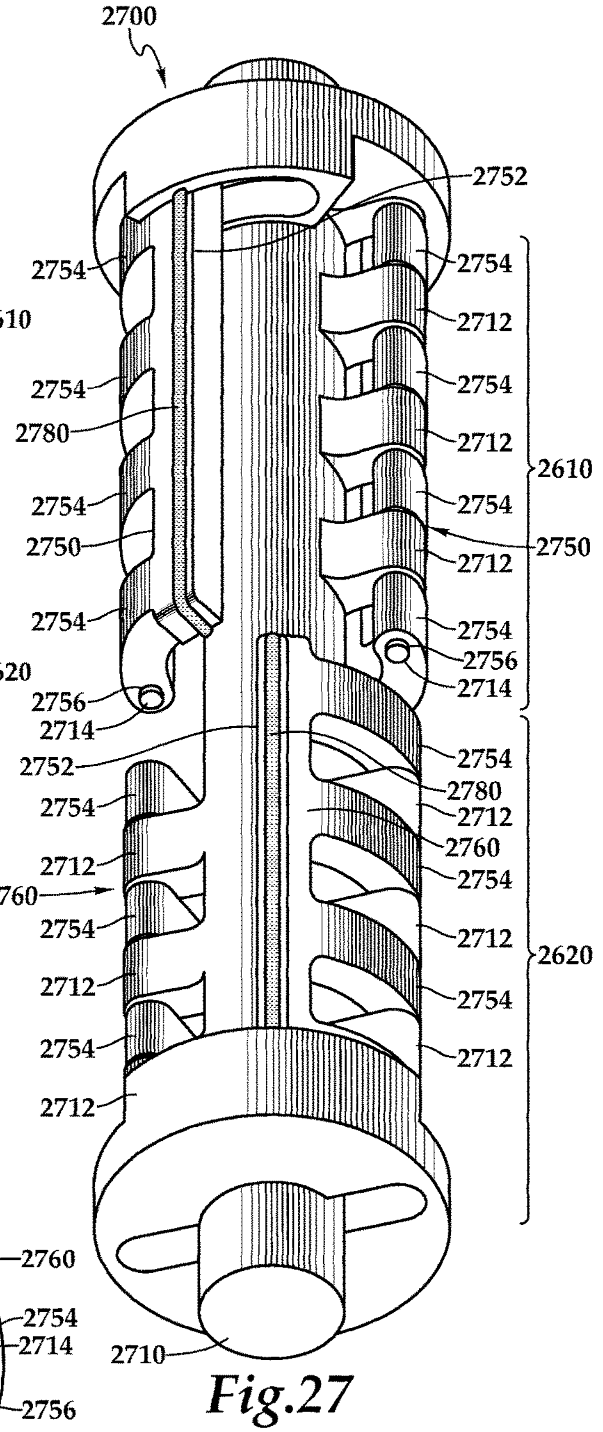
FIG. 27 is a cross-sectional view of another example rotary piston assembly.
Figure 28:
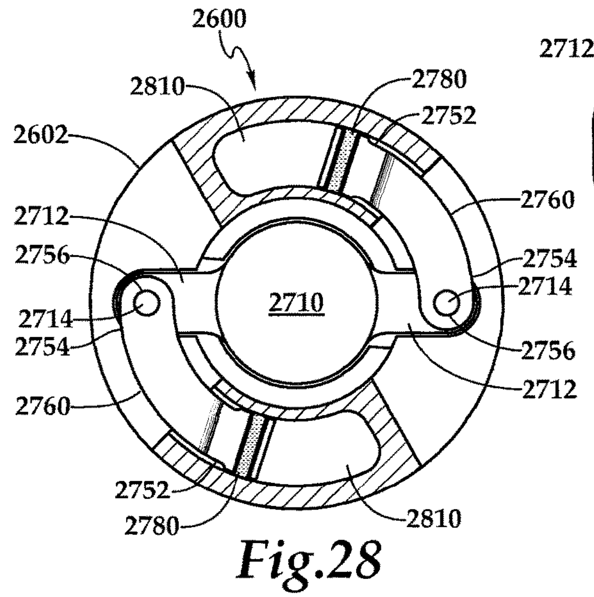
FIG. 28 is a perspective cross-sectional view of another example rotary piston-type actuator.

FIGS. 26-28 show various views of the components of another example rotary piston-type actuator 2600. In general, the actuator 2600 is similar to the example actuator 100 of FIG. 1, except for the configuration of the seal assemblies. Whereas the seal assembly 320 in the example actuator 100 remains substantially stationary relative to the pressure chamber 310 and is in sliding contact with the surface of the rotary piston 250, in the example actuator 2600, the seal configuration is comparatively reversed as will be described below.

Referring to FIG. 26, a perspective view of the example rotary piston-type actuator 2600 is shown. The actuator 2600 includes a rotary piston assembly 2700 and a pressure chamber assembly 2602. The actuator 2600 includes a first actuation section 2610 and a second actuation section 2620. In the example of actuator 2600, the first actuation section 2610 is configured to rotate the rotary piston assembly 2700 in a first direction, e.g., counter-clockwise, and the second actuation section 2620 is configured to rotate the rotary piston assembly 2700 in a second direction substantially opposite the first direction, e.g., clockwise.

Referring now to FIG. 27, a perspective view of the example rotary piston assembly 2700 is shown apart from the pressure chamber assembly 2602. The rotary piston assembly 2700 includes a rotor shaft 2710. A plurality of rotor arms 2712 extend radially from the rotor shaft 2710, the distal end of each rotor arm 2712 including a bore (not shown) substantially aligned with the axis of the rotor shaft 2710 and sized to accommodate one of a collection of connector pins 2714.

As shown in FIG. 27, the first actuation section 2710 of example rotary piston assembly 2700 includes a pair of rotary pistons 2750, and the second actuation section 2720 includes a pair of rotary pistons 2760. While the example actuator 2600 includes two pairs of the rotary pistons 2750, 2760, other embodiments can include greater and/or lesser numbers of cooperative and opposing rotary pistons.

In the example rotary piston assembly shown in FIG. 27, each of the rotary pistons 2750, 2760 includes a piston end 2752 and one or more connector arms 2754. The piston end 252 is formed to have a generally semi-circular body having a substantially smooth surface. Each of the connector arms 2754 includes a bore 2756 substantially aligned with the axis of the semi-circular body of the piston end 2752 and sized to accommodate one of the connector pins 2714.

In some implementations, each of the rotary pistons 2750, 2760 includes a seal assembly 2780 disposed about the outer periphery of the piston ends 2752. In some implementations, the seal assembly 2780 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 2600 may be reduced by using a standard, e.g., commercially available, semi-circular, unidirectional seal designs generally used in linear hydraulic actuators. In some embodiments, the seal assembly 2780 can be a one-piece seal.

FIG. 28 is a perspective cross-sectional view of the example rotary piston-type actuator 2600. The illustrated example shows the rotary pistons 2760 inserted into a corresponding pressure chamber 2810 formed as an arcuate cavity in the pressure chamber assembly 2602. The rotary pistons 2750 are also inserted into corresponding pressure chambers 2810, not visible in this view.

In the example actuator 2600, when the rotary pistons 2750, 2760 are each inserted through an open end 2830 of each pressure chamber 2810, each seal assembly 2780 contacts the outer periphery of the piston end 2760 and the substantially smooth interior surface of the pressure chamber 2810 to form a substantially pressure-sealed region within the pressure chamber 2810.

In some embodiments, the seal 2780 can act as a bearing. For example, the seal 2780 may provide support for the piston 2750, 2760 as it moves in and out of the pressure chamber 310.

FIGS. 29A-29E are various views of another example rotary piston-type actuator 2900 with a central actuation assembly 2960. For a brief description of each drawing see the brief description of each of these drawings included at the beginning of the Description of the Drawings section of this document.

In general, the example rotary piston-type actuator 2900 substantially similar to the example rotary piston-type actuator 1200 of FIGS. 12-14, where the example rotary piston-type actuator 2900 also includes a central actuation assembly 2960 and a central mounting assembly 2980. Although the example rotary piston-type actuator 2900 is illustrated and described as modification of the example rotary piston-type actuator 1200, in some embodiments the example rotary piston-type actuator 2900 can implement features of any of the example rotary piston-type actuators 100, 400, 700, 800, 1200, 1500, 1700, 1900, 2200, 2300, and/or 2600 in a design that also implements the central actuation assembly 2960 and/or the central mounting assembly 2980.

The actuator 2900 includes a rotary piston assembly 2910, a first actuation section 2901 and a second actuation section 2902. The rotary piston assembly 2910 includes a rotor shaft 2912, a collection of rotor arms 2914, and the collection of dual rotary pistons, e.g., the dual rotary pistons 1216 of FIGS. 12-14.

The first actuation section 2901 of example actuator 2900 includes a first pressure chamber assembly 2950*a*, and the second actuation section 2902 includes a second pressure chamber assembly 2950*b*. The first pressure chamber assembly 2950*a* includes a collection of pressure chambers, e.g., the pressure chambers 1252*a* of FIGS. 12-14, formed as arcuate cavities in the first pressure chamber assembly 2950*a*. The second pressure chamber assembly 2950*b* includes a collection of pressure chambers, e.g., the pressure chambers 1252*b* of FIGS. 12-14, formed as arcuate cavities in the second pressure chamber assembly 2950*b*. A semi-circular bore 2953 in the housing accommodates the rotor shaft 2912.

The central mounting assembly 2980 is formed as a radially projected portion 2981 of a housing of the second pressure chamber assembly 2950*b*. The central mounting assembly 2980 provides a mounting point for removably affixing the example rotary piston-type actuator 2900 to an external surface, e.g., an aircraft frame. A collection of holes 2982 formed in the radially projected section 2981 accommodate the insertion of a collection of fasteners 2984, e.g., bolts, to removably affix the central mounting assembly 2980 to an external mounting feature 2990, e.g., a mounting point (bracket) on an aircraft frame.

The central actuation assembly 2960 includes a radial recess 2961 formed in a portion of an external surface of a housing of the first and the second actuation sections 2901, 2902 at a midpoint along a longitudinal axis AA to the example rotary piston-type actuator 2900. An external mounting bracket 2970 that may be adapted for attachment to an external mounting feature on a member to be actuated, (e.g., aircraft flight control surfaces) is connected to an actuation arm 2962. The actuation arm 2962 extends through the recess 2961 and is removably attached to a central mount point 2964 formed in an external surface at a midpoint of the longitudinal axis of the rotor shaft 2912.

Figure 29A:
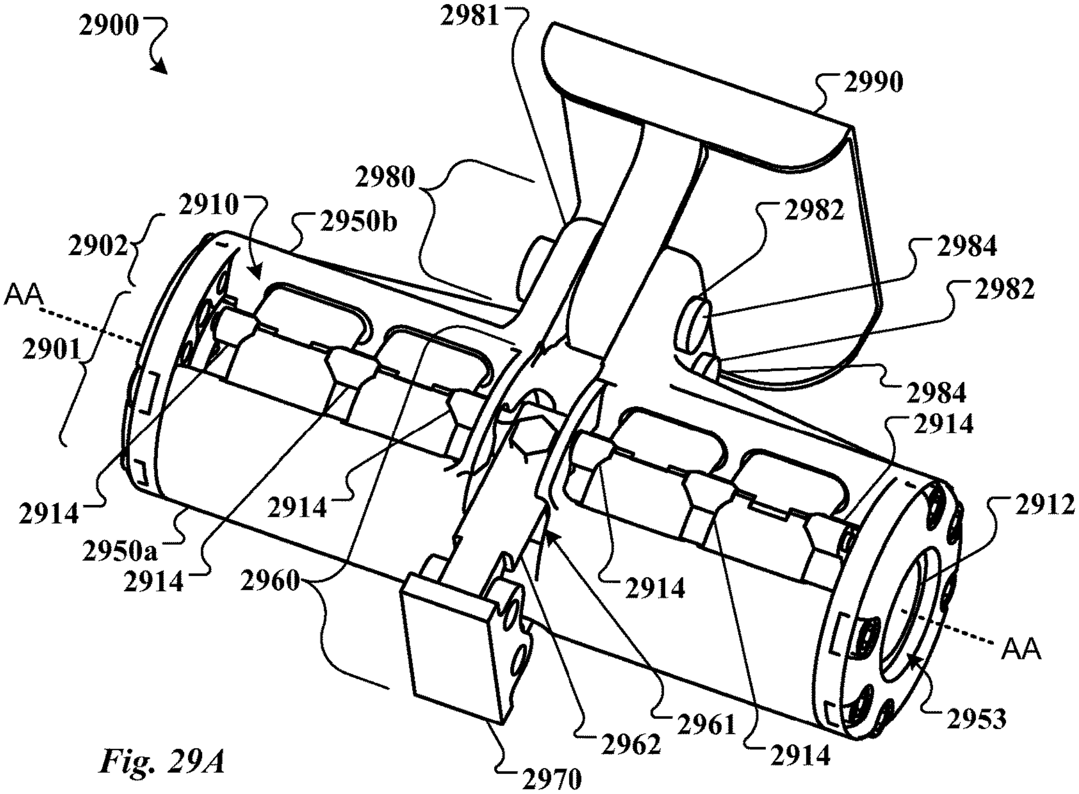
FIG. 29A is a perspective view form above of an example rotary-piston type actuator with a central actuation assembly.
Figure 29B:
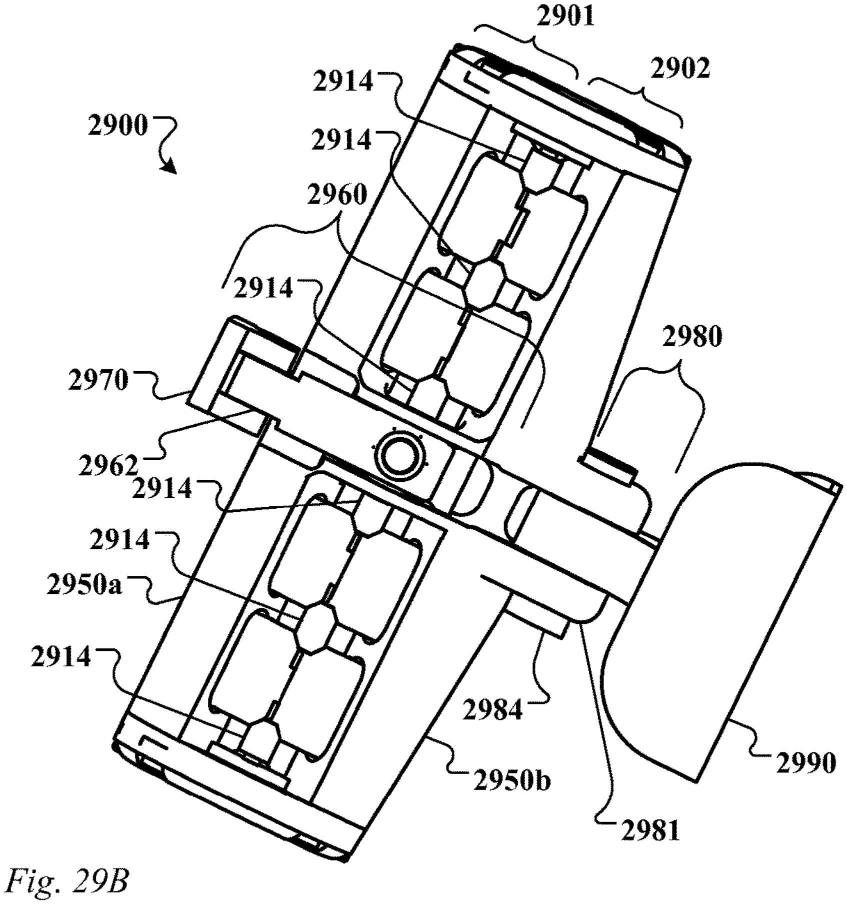
FIG. 29B is a top view of the actuator of FIG. 29A.
Figure 29C:
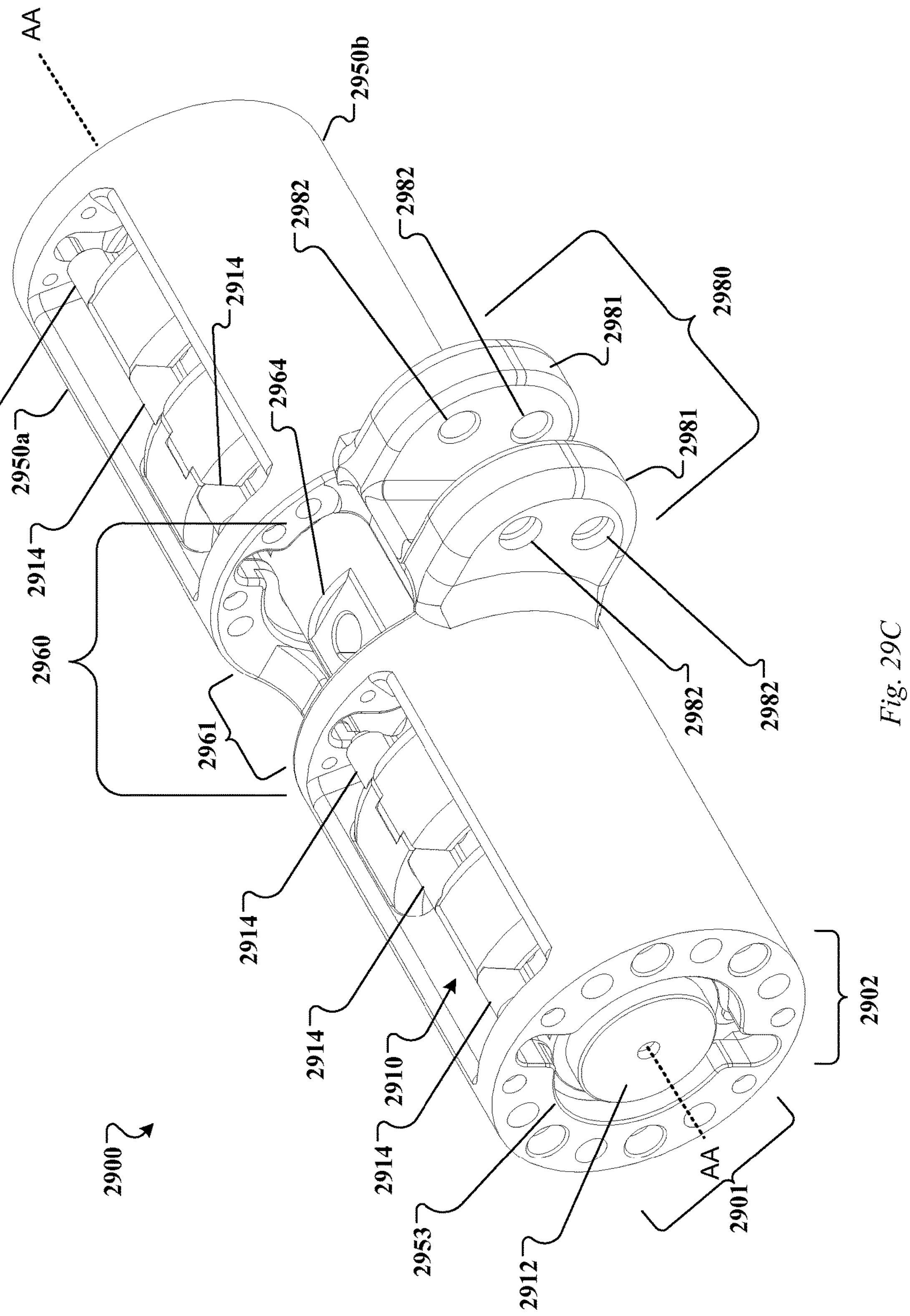
FIG. 29C is a perspective view from the right side and above illustrating the actuator of FIG. 29A with a portion of the central actuation assembly removed for illustration purposes.
Figure 29D:
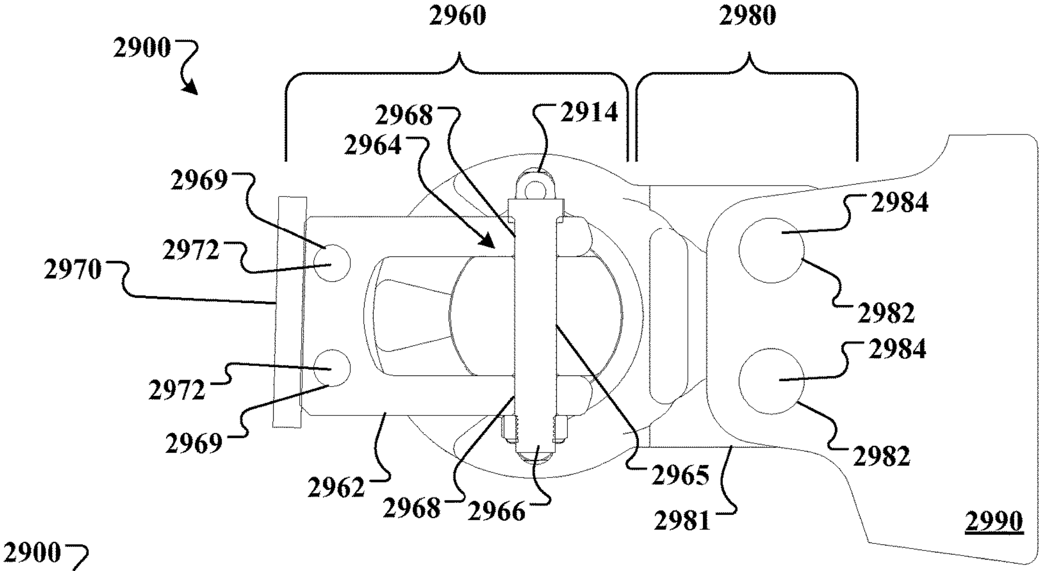
FIG. 29D is a lateral cross section view taken at section AA of the actuator of FIG. 29B.
Figure 29E:
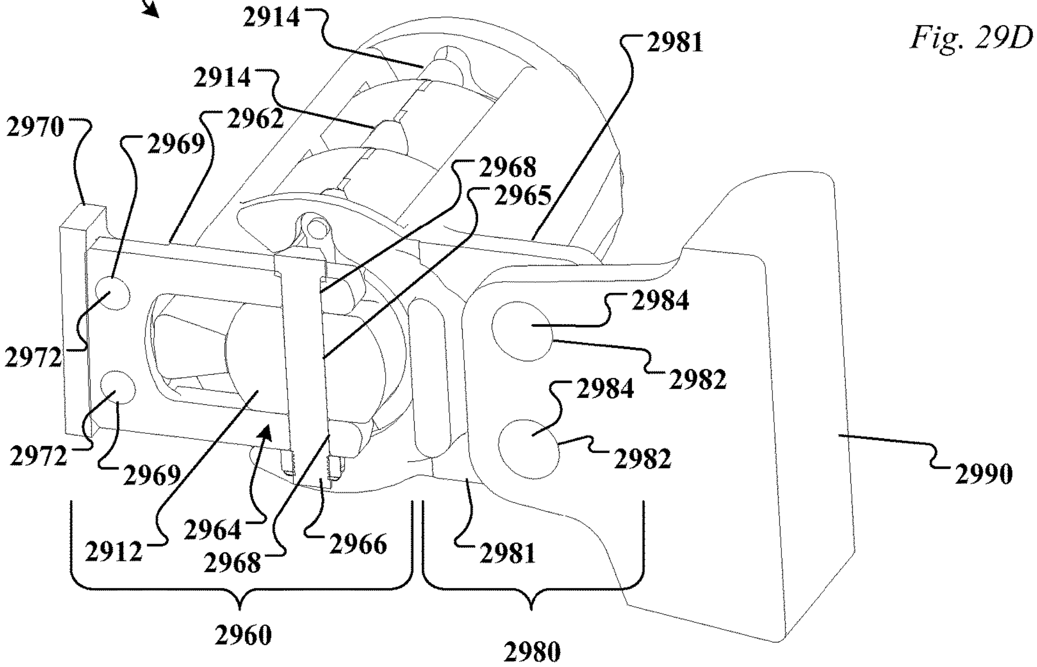
FIG. 29E is a partial perspective view from cross section AA of FIG. 2B.

Referring more specifically to FIGS. 29D and 29E now, the example rotary piston-type actuator 2900 is shown in cutaway end and perspective views taken though a midpoint of the central actuation assembly 2960 and the central mounting assembly 2980 at the recess 2961. The actuation arm 2962 extends into the recess 2961 to contact the central mount point 2964 of the rotor shaft 2912. The actuation arm 2962 is removably connected to the central mount point 2964 by a fastener 2966, e.g., bolt, that is passed through a pair of holes 2968 formed in the actuation arm 2962 and a hole 2965 formed through the central mount point 2964. A collection of holes 2969 are formed in a radially outward end of the actuation arm 2962. A collection of fasteners 2972, e.g., bolts, are passed through the holes 2969 and corresponding holes (not shown) formed in an external mounting feature (bracket) 2970. As mentioned above, the central actuation assembly 2960 connects the example rotary piston actuator 2900 to the external mounting feature 2970 to transfer rotational motion of the rotor assembly 2910 to equipment to be moved (actuated), e.g., aircraft flight control surfaces.

In some embodiments, one of the central actuation assembly 2960 or the central mounting assembly 2980 can be used in combination with features of any of the example rotary piston-type actuators 100, 400, 700, 800, 1200, 1500, 1700, 1900, 2200, 2300, and/or 2600. For example, the example rotary piston-type actuator 2900 may be mounted to a stationary surface through the central mounting assembly 2980, and provide actuation at one or both ends of the rotor shaft assembly 2910. In another example, the example rotary piston assembly 2900 may be mounted to a stationary surface through non-central mounting points, and provide actuation at the central actuation assembly 2960.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A rotary actuator comprising:

a housing;

a rotor assembly rotatably journaled in said housing and including a rotary output shaft and a first rotor arm extending radially outward from the rotary output shaft;

a centrally located actuation assembly including a centrally located mounting point formed in an external surface of the rotary output shaft, said centrally located mounting point being located proximal to the longitudinal midpoint of the rotary output shaft, wherein the centrally located actuation assembly further includes a radial recess formed in an external peripheral surface of the housing proximal to the centrally located mounting point of the rotor shaft;

an actuation arm removably attached at a proximal end to the centrally located mounting point, said actuation arm adapted at a distal end for attachment to an external mounting feature of a member to be actuated, and wherein said actuation arm extends through the radial recess; and a centrally located mounting assembly comprising a radially projecting portion of the housing, said centrally located mounting assembly axially disposed about 180 degrees from the radial recess of the centrally located actuation assembly, said centrally located mounting assembly adapted for attachment to an external mounting feature.

2. The rotary actuator of claim 1, wherein the housing defines a first arcuate chamber including a first cavity, a first fluid port in fluid communication with the first cavity, and an open end; and wherein the rotary actuator further comprises an arcuate-shaped first piston disposed in said housing for reciprocal movement in the first arcuate chamber through the open end, wherein a first seal, the first cavity, and the first piston define a first pressure chamber, and a first portion of the first piston contacts the first rotor arm.

3. The rotary actuator of claim 2, wherein the housing further defines a second arcuate chamber comprising a second cavity, and a second fluid port in fluid communication with the second cavity.

4. The rotary actuator of claim 3, wherein:

the rotor assembly further comprises a second rotor arm; and the rotary actuator further comprises an arcuate-shaped second piston disposed in said housing for reciprocal movement in the second arcuate chamber, wherein a second seal, the second cavity, and the second piston define a second pressure chamber, and a first portion of the second piston contacts the second rotor arm.

5. The rotary actuator of claim 1, wherein the housing is a unitary one-piece housing.

6. A method of rotary actuation comprising:

providing a rotary actuator comprising:

a housing;

a rotor assembly rotatably journaled in said housing and comprising a rotary output shaft and a first rotor arm extending radially outward from the rotary output shaft;

a centrally located actuation assembly including a centrally located mounting point formed in an external surface of the rotary output shaft, said centrally located mounting point proximal to the longitudinal midpoint of the rotary output shaft, wherein the centrally located actuation assembly further includes a radial recess formed in an external peripheral surface of the housing proximal to the centrally located mounting point of the rotor shaft;

an actuation arm removably attached at a proximal end to the centrally located mounting point, said actuation arm adapted at a distal end for attachment to an external mounting feature of a member to be actuated, and wherein said actuation arm extends through the radial recess; and a centrally located mounting assembly comprising a radially projecting portion of the housing, said centrally located mounting assembly axially disposed about 180 degrees from the radial recess of the centrally located actuation assembly, said centrally located mounting assembly adapted for attachment to an external mounting feature;

rotating the rotary output shaft in a first direction; and rotating the rotary output shaft in a second direction opposite that of the first direction.

7. The method of claim 6, wherein the housing defines a first arcuate chamber including a first cavity, a first fluid port in fluid communication with the first cavity, and an open end; and wherein the rotary actuator further comprises an arcuate-shaped first piston disposed in said housing for reciprocal movement in the first arcuate chamber through the open end, wherein a first seal, the first cavity, and the first piston define a first pressure chamber, and a first portion of the first piston contacts the first rotor arm, and wherein the rotary actuator further comprises an actuation arm removably attached at a proximal end to the centrally located mounting point, said actuation arm adapted at a distal end for attachment to an external mounting feature of a member to be actuated;

wherein the method further comprises:

applying pressurized fluid to the first pressure chamber;

urging the first piston partially outward from the first pressure chamber to urge rotation of the rotary output shaft in a first direction;

urging, by rotating the rotary output shaft in the second direction, the first piston partially into the first pressure chamber to urge pressurized fluid out the first fluid port.

8. The method of claim 7, wherein the housing further defines a second arcuate chamber comprising a second cavity, and a second fluid port in fluid communication with the second cavity.

9. The method of claim 8, wherein:

the rotor assembly further comprises a second rotor arm; and the rotary actuator further comprises an arcuate-shaped second piston disposed in said housing for reciprocal movement in the second arcuate chamber, wherein a second seal, the second cavity, and the second piston define a second pressure chamber, and a first portion of the second piston contacts the second rotor arm.

10. The method of claim 7, wherein the housing is a unitary one-piece housing.

* * * * *